United States Patent [19]
Fisher et al.

[11] Patent Number: 6,092,189
[45] Date of Patent: Jul. 18, 2000

[54] CHANNEL CONFIGURATION PROGRAM SERVER ARCHITECTURE

[75] Inventors: Jerald C. Fisher, Tomball; Lien Dai Nguyen; James Young, both of Houston; Gunnar P. Seaburg, The Woodlands; Galen W. Hedlund, Tomball; Richard S. Katz, Spring, all of Tex.

[73] Assignee: Compaq Computer Corporation, Houston, Tex.

[21] Appl. No.: 09/070,589

[22] Filed: Apr. 30, 1998

Related U.S. Application Data

[60] Provisional application No. 60/053,455, Jul. 22, 1997.

[51] Int. Cl.[7] .......................... G06F 9/445; G06F 11/00; G06F 9/45
[52] U.S. Cl. ................................ 713/1; 713/200
[58] Field of Search ................... 713/1, 2, 200; 395/701, 712; 714/38

[56] References Cited

U.S. PATENT DOCUMENTS

| | | | |
|---|---|---|---|
| 5,555,416 | 9/1996 | Owens et al. | 395/700 |
| 5,835,777 | 11/1998 | Staelin | 395/712 |
| 5,860,012 | 1/1999 | Luu | 395/712 |
| 5,930,513 | 7/1999 | Taylor | 395/712 |
| 5,931,909 | 8/1999 | Taylor | 709/221 |
| 5,963,743 | 11/1999 | Amberg et al. | 395/712 |

OTHER PUBLICATIONS

Bournellis, Cynthia and McAleer, Bernard, "Buildto–Order Program Is Launched by Compaq", Electronic Times, Jul. 14, 1997, 2 pages.

Wall Street Journal, Jul. 10, 1997, Compaq advertisement, 8 pages.

*Primary Examiner*—Joseph E. Palys
*Assistant Examiner*—Ronald D Hartman, Jr.
*Attorney, Agent, or Firm*—Conley, Rose & Tayon, P.C.

[57] ABSTRACT

A process for the mass production of computers where software is automatically installed according to configure-to-order requirements. Additionally, the process captures the as-built hardware and software components of each computer for the vendor service and support program. Furthermore, the process provides a software installation environment which is secure from any undetectable alteration and offers control and auditing of subcontractors who produce systems according to manufacturer's specifications. Finally, the process automates the tracking and reporting of royalty payments to the appropriate recipient.

22 Claims, 15 Drawing Sheets

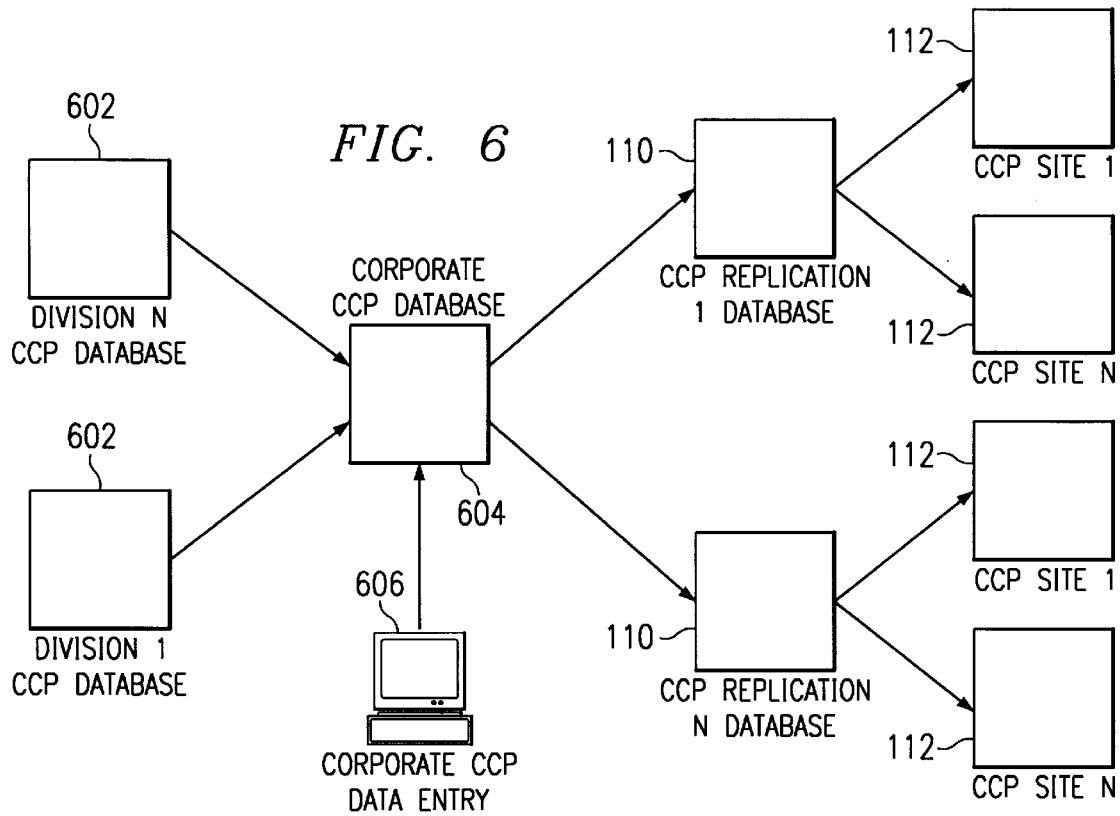
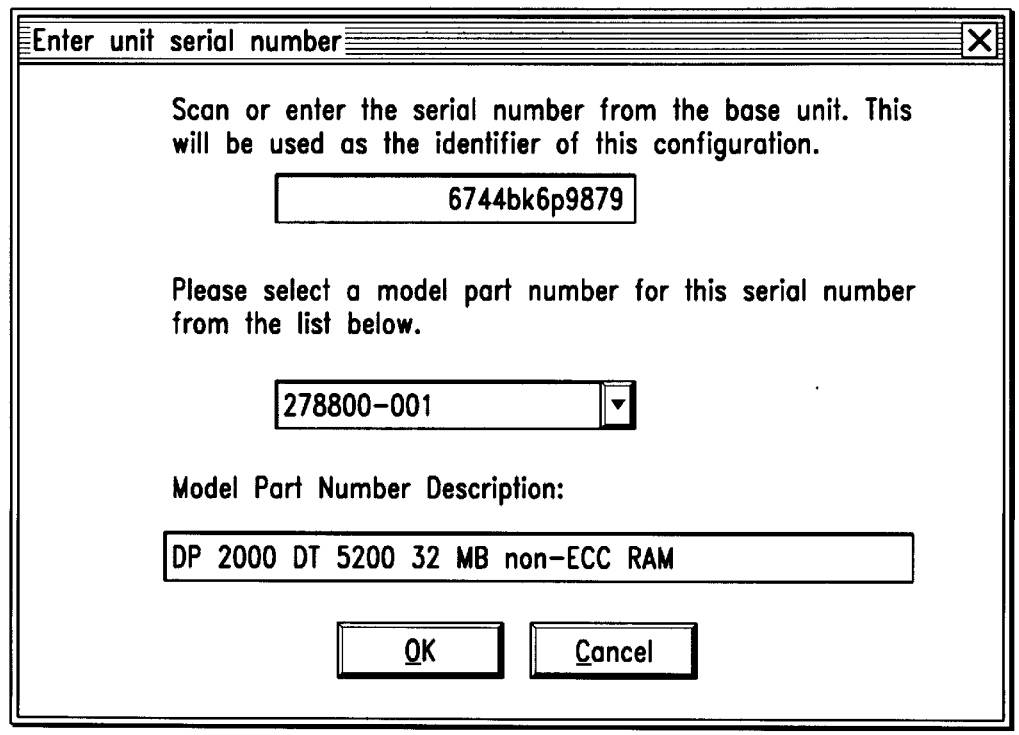
FIG. 7A

| | Part Number | Description | Serial Number |
|---|---|---|---|
| BASE MODEL | ... 278800-001 | DP 2000 DT 5200 32 MB non-EC... | 6744bk6p9879 |
| HARD DRIVE | ... 294235-B21 | 3.2GB IDE ... | 1000567xxx98 |
| CD-ROM | ... 294181-B21 | 24X IDE CD-ROM Drive ... | 887665444er3 |

Compaq Hardware

New part: Part number: 294172  Serial number: xxx89434

[< Back] [Next >] [Cancel] [Help]

FIG. 7B

Component Software Selection

| | Part Number | Description | Serial Number |
|---|---|---|---|
| BASE MODEL | ... 278800-001 | DP 2000 DT 5200 32 MB non-EC... | 6744bk6p9879 |
| HARD DRIVE | ... 294235-B21 | 3.2GB IDE | 1000567xxx98 |
| CD-ROM | ... 294181-B21 | 24X IDE CD-ROM Drive | 887665444er3 |

Language: English (US)
Operating System: WINDOWS 95 SR2
Applications:

[< Back] [Next >] [Cancel] [Help]

FIG. 7C

CHANNEL CONFIGURATION PROGRAM SERVER ARCHITECTURE

CROSS-REFERENCE TO RELATED APPLICATION

This application claims priority from Provisional Application 60/053,455 filed Jul. 22, 1997, which is hereby incorporated by reference. However, the content of the present application is not identical to that of the priority application.

BACKGROUND AND SUMMARY OF THE INVENTION

The present application relates to computer manufacturing, and particularly to the architecture of hardware for pre-installation of software at remote computer manufacturing and test facilities.

Background: Software Installation

Software installation is normally a burden with new computers, and is often a source of frustration for consumers. Thus, pre-installation of software by the computer manufacturer is very welcome to consumers. Pre-installation also helps to avoid problems which might be caused by software incompatibilities or incorrect installation of software. Pre-installation of software also helps to avoid unnecessary service calls to the computer manufacturer which may be due to the consumer's difficulty in understanding the software installation instructions.

Software Management

Pre-installation of software to prevent incompatibilities or incorrect installation at the consumer level requires careful software management. This management takes place not only prior to but also during the manufacturing process.

Traditionally, pre-installation is accomplished through creation of disk images. A disk image is a file that holds a copy of all of the data, including partitioning and driver information, contained on a given storage medium (usually a hard disk drive). Disk images are usually prepared by a software engineering group once a personal computer has been configured with all of the appropriate components (operating system, applications, utilities, TSRs, etc.). This configured computer is referred to as a "master". The disk images themselves are then replicated and distributed to remote manufacturing sites for installation on consumer machines.

Configuration and installation takes place prior to packing the unit for shipping in order to provide the consumer with a unit that is operable ("ready to run") upon receipt. Configuration of the unit encompasses partitioning the unit's hard drive, setting up boot information, and adding file directory structure information. Installation is the process of writing the physical software files to the hard drive.

Background: Zip Deliverables

The role of a software distribution system is to facilitate the transfer of software, which is to be released to the consumer, to the manufacturing site. Once at the manufacturing site, the software will be installed and configured on a raw (unformatted) hard drive or the hard drive of a newly assembled personal computer.

Current distribution techniques depend on a batch delivery system. The batch is composed of a disk image (namely, the set of files released for installation consisting of all required components) which has been compressed into a single deliverable unit. Compression is a process by which the disk image is condensed in order to take up less storage space. Such a unit is often referred to as a "zip deliverable", which is a reference to the compression utility, PKZIP™, most often used to create the compressed file deliverable.

Currently, zip deliverables are distributed in what is known as the drop method, that is, when any change is made to just one of the files constituting the zip deliverable, the entire deliverable must be rebuilt and redistributed (dropped) to the manufacturing site. Such a distribution method puts an even greater demand on transmission capabilities, since all rebuilt deliverables will need to be redistributed to the manufacturing facilities in a relatively short period of time. Without prompt updates, the manufacturer has to allocate greater resources to post-consumer fixes.

Background: Disk Image Disadvantages

The use of disk images for distribution of software has inherent disadvantages. First, the size of disk images needed to distribute complete system software configurations has grown almost exponentially in the past 10 years, from 30 megabytes to over 400 megabytes, due to the increased hard disk space requirements of more functional operating systems and feature-rich applications. Consequently, the storage media for the disk image must meet ever increasing capacity demands and distribution costs continue to rise.

Second, disk images are limited to one configuration. Changes in disk image configuration can result from any difference in hardware and software combinations. For each change in configuration, no matter how slight, an entirely new disk image must be built, replicated, and distributed. Most installation configurations tend to have one or more files in common, such as the operating system or user applications. This results in many files being duplicated and distributed multiple times. Large amounts of hardware storage space are required to store these common files multiple times, once for each minor difference in configuration.

Third, disk images cannot be updated. Once a disk image is built, it cannot be modified. Components that comprise disk images may need to be changed because of a software bug fix or new revision. If a component is changed, each disk image incorporating that component must be rebuilt, replicated, and distributed.

Fourth, in addition to greater demands on storage space, the amount of time to distribute multiple disk images has greatly increased. With each different configuration, time must be taken to create its disk image. The disk image must then be distributed. The increase in the size of the disk image, even if the distribution system is computer network based, has a corresponding effect on the disk image transmission time. As the number of different computer configurations grows, improved transmission capability in terms of both speed and accuracy is required. Both speed and accuracy factor into maintaining efficient distribution of software to computer manufacturing facilities. Minimizing distribution time for disk images can be critical when updates to components have occurred to fix software bugs: The faster the disk image can be propagated to the installation site, the fewer the number of computers released with faulty software.

Finally, zip deliverables have the inherent disadvantage of a lack of security. During the distribution process, the media which contain the software may not be within the control of the manufacturer. If the zip deliverables are distributed via a common carrier, they could be misplaced or stolen. Because the zip deliverable is merely a compressed version of a configured software install, there is some risk that it could be used by anyone with the proper hardware and software to install or upgrade software on their own machine or the machines of others. Further, there is some risk that an intercepted zip deliverable could be imperceptibly altered to remove or add data (including viruses) and then sent on to the remote manufacturing facility.

This lack of control over the zip deliverable can also result in vulnerability to extreme ambient conditions which could adversely effect the quality and accuracy of the data on the media. Weather conditions such as extreme temperatures or moisture can degrade the quality of the media, and hence the ability of the data on the media to be accurately read and installed. Electromagnetic fields can also cause the data on the media to become corrupted. This corrupted data can result in media that will not properly install or media that installs corrupt data. Some risk exists that mildly corrupted installations may not be discovered until after the computer has left the factory.

Remote manufacturing facilities are not necessarily under the control of the manufacturing headquarters. In fact, some remote manufacturing facilities may be responsible for the assembly and configuration of machines from many different computer manufacturers. The zip deliverables themselves may contain the proprietary software of a particular company. Therefore, security of pre-installation software configurations is important within the remote manufacturing facility. A further concern, even at the remote manufacturing facility, is that the zip deliverables, due to their small size and ready mobility, could become misappropriated.

Background: As-Built Database

To provide good customer support, access to a database which shows the as-built configuration of each computer is very useful.

In remote manufacturing or third-party manufacturing situations, an as-built database which tracks installed hardware by serial number can be instrumental as a check on the manufacturing process. For example, NICs or video boards provided by the manufacturer can be tracked to ensure that they are installed in the manufacturers' computers. Software applications can be tracked as well. The as-built database enables the manufacturer to accurately report to software vendors the number of a particular software application that they have installed. Not only does this information aid in royalty tracking but it also provides marketing information on which software is being installed more often, or not at all.

Presently, less sophisticated manufacturers cannot access the as-built database when a customer calls in with a problem. The support specialist queries the customer as to what configuration he has and continues from there. In many cases, the customer has no idea of the specifics of internal components and as a result, the support process is problematic, cumbersome, frustrating, and leads to further consumer dissatisfaction and future lost sales where there may have been a potential. The as-built database provides customer support personnel with the ability to provide solutions to the customer quickly, especially when known conflicts or bugs have been found with software or hardware installed in the manufacturing process.

A further benefit obtained from an as-built database is the capability to inform customers of changes or updates relative to specific hardware or software. Such notifications could be in the form of service bulletins that can explain in detail how to install fixes or obtain updates to resolve problems with hardware or software.

Background: Bandwidth

Bandwidth is a measure of data capacity, i.e., the transmission rate of data for a given protocol and architecture. It describes the maximum amount of data that can be carried during a given time frame. Bandwidth values are usually given in mega-bits per second (or "Mbps"). In 1996, the bandwidth capacity of most remote manufacturing facilities was 100 Mbps. This bandwidth is relatively high when compared to the normal bandwidth of around 10 Mbps or less used by most consumers and businesses for their local networking needs. The high bandwidth is necessary to accommodate fast downloads of software and diagnostics during the manufacturing process. In 1998, a bandwidth of 1 gigabit per second is not yet commercially feasible. However, high bandwidth does not come without a price. Even though the cost of networking is constantly falling, higher bandwidth networks, in general, cost more to implement than their lower bandwidth counterparts. This includes the network interface cards (or "NICs") which enable computers to connect to the server at higher speeds. The cabling itself also costs more because it must be more efficient and robust.

Channel Configuration Program Server Architecture

The present application describes a manufacturing architecture whereby a computer manufacturer can safely contract out high-quality configure-to-order manufacturing. Two separate databases are used in installing software and managing the installation process and collecting configuration information. Software to be pre-installed is distributed over a database network to a software installation server at a remote manufacturing site. The database tables include error-checking values to ensure that data distributed over the network has not become corrupted. The remote manufacturer is given physical access to the software-installation server which installs the desired software configuration on each machine; but this is a secure server, and the contract manufacturer is unable to change it. Rules which define the possible hardware and software configurations are also distributed over a network to a channel configuration partner (CCP) database at the remote manufacturing site. These rules are used to create a list of software and hardware part numbers which will constitute a newly manufactured computer. The CCP database is also used to store the list as an "as-built" database of computers manufactured at the remote manufacturing site. Moreover, the contract manufacturer is also unable to change the as-built database (although read access is allowed).

In particular, the process combines the manual configuration of hardware subassemblies with an automated method for loading the correct software for the particular hardware installed. The hardware configuration information is collected by a server which manages software selection. Software pre-installation uses the information collected in hardware configuration and software selection to provide the appropriate software to the assembled unit.

Additionally, the process captures the as-built hardware and software components of each computer for the vendor service and support program. Finally, the process automates the tracking and reporting of royalty payments to the appropriate recipient.

In an alternative embodiment the entire process can be implemented with a double-server architecture, in which one server would be the source for the software to be installed, and the other server would manage the flow of control information. Currently, the server connectivity for software installation is implemented with a high bandwidth architecture. However, the server which manages the flow of control information does not require such high bandwidths and can be implemented with a separate, lower bandwidth architecture.

The advantages of the innovative optimized distribution model are numerous. A secure, as-built database provides a separate, isolated hardware and software tracking mechanism. Hardware such as monitors, keyboards, CD drives, etc. can be tracked even at remote manufacturing facilities. This tracking ability can impact the pirating of hardware. That is, the use of inferior hardware by a remote manufacturer under the guise of name-brand installations. In a like manner, software installations can be tracked to ensure that duplicate certificates of authenticity or software serial numbers are not installed.

Another advantage of this innovative process is the capability to feed Quality-Control solutions back into the manufacturing process more quickly for delivery of a reliable product.

Another advantage is that technical support and service personnel are able to solve customer complaints more quickly because of the access to the as-built configuration database. The central database captures the as-built configuration of each computer as it progresses from start to final test.

Another advantage is the control, security, and auditing that can be exerted over subcontractors contracted for off-site assembly. A centralized database provides all build-to-order information needed by the subcontractor to assemble a reliable product. The process also provides auditing capability to ensure conformity with quality standards set in place by the manufacturer.

Another advantage is the ability to meet consumer demands with delivery of a reliable product in a very short period of time.

Another advantage is that software can be installed from the same database structures in which it was released without having to go through a preparatory step which extracts the data before installation.

Another advantage is that separate disk images for each minor configuration change will not have to be produced and distributed, and any configuration needed can be created via the software selection process.

Another advantage is more efficient updating: Updates can be released at any time and propagated through the software distribution system, without the need to rebuild multiple disk images and without the delay usually associated with their distribution.

It is important, particularly in the context of pre-installation of software, that network traffic which does not require such high bandwidths be isolated from the traffic which does. An advantage of this class of embodiments is that the managing server can be implemented with a lower bandwidth architecture which reduces costs. Cost savings are achieved primarily by taking unnecessary traffic which can degrade performance off of the high bandwidth server. Secondary savings are achieved by using a lower cost architecture. Savings can also be achieved when upgrading networks. A new network need only be provided for the new higher bandwidth network. The lower bandwidth network can then be migrated to the former high bandwidth network.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 6 shows a block diagram of the software configuration information data flow between manufacturing headquarters and a remote manufacturing facility.

FIGS. 7A–C depict input windows for hardware and software component selection.

DETAILED DESCRIPTION OF THE PREFERRED EMBODIMENTS

Figure 1:
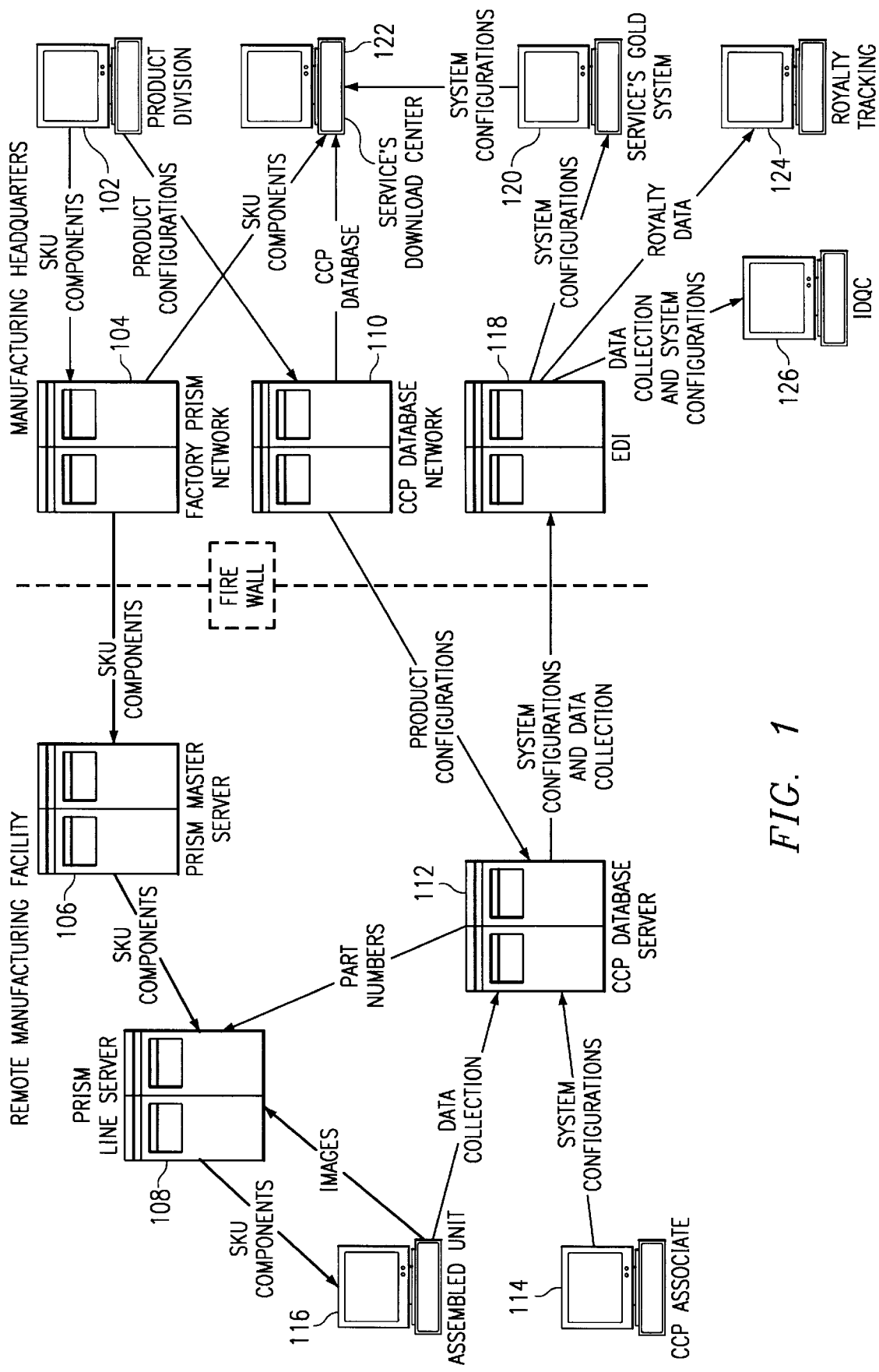
FIG. 1 shows a block diagram of the data flows between and within a remote manufacturing facility and manufacturing headquarters.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The present application has drawings in common with and hereby incorporates by reference the following commonly-owned applications:

Ser. No. 09/070,603, filed simultaneously herewith;

Ser. No. 09/070,431, filed simultaneously herewith; and

Ser. No. 09/002,152, filed Dec. 31, 1997.

As software applications to run and support personal computers continue to become more functional and feature-rich, their physical size will also continue to grow. This directly affects the distribution systems used to deliver software configurations to be installed prior to consumer sale. As the number and size of different configurations grows, the system must be updated to continue to provide an effective distribution and installation mechanism.

A system of software distribution and installation that incorporates management of data and software configuration rules via a database, such as the one described in the present application overcomes many of the difficulties in the present software distribution system. Further, it allows minimization of storage requirements at the computer manufacturing sites while maximizing the flexibility of software configurations that can be installed.

By installing software at the manufacturing site instead of relying on the consumer for installation proper configuration of the machine is ensured and the overhead of customer support is minimized. Once customer support is required, a database containing the hardware and software configuration of the machine when it left the factory can be accessed to provide more efficient service. Moreover, the database information can be utilized to provide information to reconfigure a machine should it need to be repaired.

Definitions

Assembled Unit: The computer system that is built from the manufacturer's hardware and software components. Third-party hardware and software may be added after the manufacturer's system is built.

Attributes: Each entity may have properties that stores information about the entity. These properties are called the attributes of an entity.

BLOb ("Binary Large Object"): A data type which can be stored in a database as a non-fixed length record. Typically used in storage of text or various kinds of binary images.

BOM ("Bill-of-Materials"): In this document, BOM refers to a software bill-of-materials. A BOM is associated with a list of compressed and/or non-compressed software files that are copied to a computer during software pre-installation.

CCP: Channel Configuration Program

CCP Assembly Cell: A physical location where computer systems are assembled.

CCP Associate: The individual responsible for assembling a computer system in the CCP Cell.

CCP Client Program: The database collection and software configuration program that executes on the CCP Client Station CCP Client Workstation: The system that is connected to the CCP database and is used for data capture and software configuration in the CCP Cell.

CCP Download Control Program: A program that executes in the assembled unit at software download time.

CCP Download diskette: The diskette that contains programs used for software download. This diskette is used on the assembled unit.

CCP Server Control Program: The CCP Server Control Program (SCP) provides an interface that is a functional replacement for the Shop Floor Data Management (SFDM) system in a manufacturing facility.

COA: Certificate of Authenticity.

CTO: Configure-to-Order: Systems built and configured upon receipt of a customer order.

DBMS ("Data Base Management System"): A product that supports the reliable storage of the database, implements the structures for maintaining relationships and constraints, and offers storage and retrieval services to users.

DSD: PRISM Surrogate Download System is a tool to place software on a target drive that is already installed in the target unit.

Entity: Entities can be defined as any person, place, thing, event, or concept about which information is kept. Nouns, like "car", "computer" or "desk" usually name entities ERD ("Entity Relationship Diagram"): A graphical representation of the relationship present in a relational database.

FAT ("File Allocation Table"): The information used by operating system software to manage files on a hard disk.

FIST ("Factory Isolation Standard Tables"): The main software interface by which all installation data preferably flows into the factory.

FUN ("Functional Normalization"): A process of elimination of duplicate files between divisions.

GEMINI: An image builder/data blaster download tool for both surrogate and direct downloading.

Line Server: A file server which serves at least one assembly line for installation of files on the hard disks of assembled computers. In the system behind FIST, the line server becomes mainly a host for a DBMS-based storage of the files to be installed.

Local PRISM Server: A server located at the CCP site that is not on the Factory PRISM Network. Images created locally are stored in the system.

MBR ("Master Boot Record"): The MBR contains minimal operating system code to load the boot sector of the partition marked as startable (or bootable), and the description of the partitions located on the hard disk.

Master Server: A file server with massive storage resources is used as the central repository for all installable files in a manufacturing facility. In the system behind FIST it becomes mainly a host for a DBMS-based storage of the files to be distributed to line servers in each factory.

PRISM ("Preinstall Reengineering Initiative for Software Management"): The factory system responsible for putting software on manufactured systems.

PRISM Line Server: A server located at the CCP site that is not on the PRISM Factory Network. Images created locally are stored in the system.

Replication: A feature of SQL Server 6.x (and many other DBMSs) which is being exploited by FIST to improve file transmission system between a headquarters site and the factories. It allows all or just certain records to be copied under certain criteria to other databases using a 'Publish and Subscribe' metaphor where one database is the publisher and all subscribers get data copied to them from the publisher.

SFDM: Shop Floor Data Management System

SKU ("Stock Keeping Unit"): A SKU is created from the part number. The description identifies the CPU, the primary hard disk, the country/keyboard and whether or not software will be pre-installed in the factory during manufacture.

Software Part Number: A standard 6-3 part number with a Material Description Code of 1005 (BTO\CTO Software).

SQL ("Structured Query Language"): A language method of accessing and maintaining a database. Also used to refer to the database itself that uses this type of language.

User: A person who operates the surrogate or direct download system.

UUT: Unit Under Test—The system currently undergoing test.

Summary Overview

The preferred embodiment discloses a system of software distribution and installation which provides for pre-installation of software at a remote manufacturing facility which is secure against any undetectable alterations. The software is then installed from the database server onto assembled computers for shipment.

The process of software distribution makes use of a network of database servers to transmit software, as configured by a software engineering group, along with its configuration information to remote manufacturing facilities. At the same time, information concerning what software is available to be pre-installed and its hardware configuration requirements is transmitted to remote manufacturing facilities over a network of database servers.

One of the innovative features disclosed is the use of database structures and a software selection process which support the installation of software which has been released by a software engineering group as individual files or as a SKU/BOM disk image. These structures allow software for installation to be selected as packages, or groups of files, and individual files.

A set of configuration rules associated with each selection ensures that the selections are compatible with each other and that all of the necessary supporting software for a particular selection is installed. The configuration rules consist of requirements for hardware, operating system, language, and other supporting software which must be installed to support the selected software. The configuration rules can also maintain a record of known incompatibilities. The software selection process is responsible for seeing that these requirements are met and the known incompatibilities avoided for each software selection. By enforcing configuration rules for each selection, the problem of incompatibility between hardware and software, and incompatibility between installed software packages is eliminated. Therefore, it is no longer necessary to rely on "as-installed" complete packages from a software engineering group. Instead, the software engineering group can release smaller groups of files, or individual files as they should be installed.

In turn, the pre-installation of software can take place without being tied to a zip deliverable. The database structures can manage the distribution and installation of individual file releases and releases of files that are logically grouped together (SKU/BOM).

At the remote manufacturing facility, hardware constituting an assembled unit is gathered. Once gathered, a configuration process is used to collect the serial number and model of the base unit. The designation of a model is used to retrieve data from the CCP database concerning what hardware and software can be installed on the machine and the configuration rules which will be used. Then the serial and part numbers of the hardware, such as the video board, NIC, keyboard, memory modules, and CD-ROM drive are entered. Language preference, operating system, and any desired software applications to be installed on the machine are also collected by the process.

All of this information is used in a rules evaluation process which translates the selections into a list of the particular released software that is to be installed on the assembled unit, including diagnostics, drivers, and other files needed by the assembled unit to run properly upon receipt. The CCP database will store this list in an "as-built" table for later use in the process and by royalty tracking, customer service, and quality control divisions of the manufacturer The unit is then assembled and connected to the network with access to the software download database and the CCP database. A process running on the assembled unit retrieves the as-built list for the unit from the CCP database. This list of software and hardware part numbers is used during post-installation diagnostic checks. The process then initiates the software pre-installation process. The software download server retrieves the list of software to be installed on the assembled unit from the CCP database. The software is downloaded and configured for the particular machine.

General Organization of Database Servers and Process Flow

Figure 3:
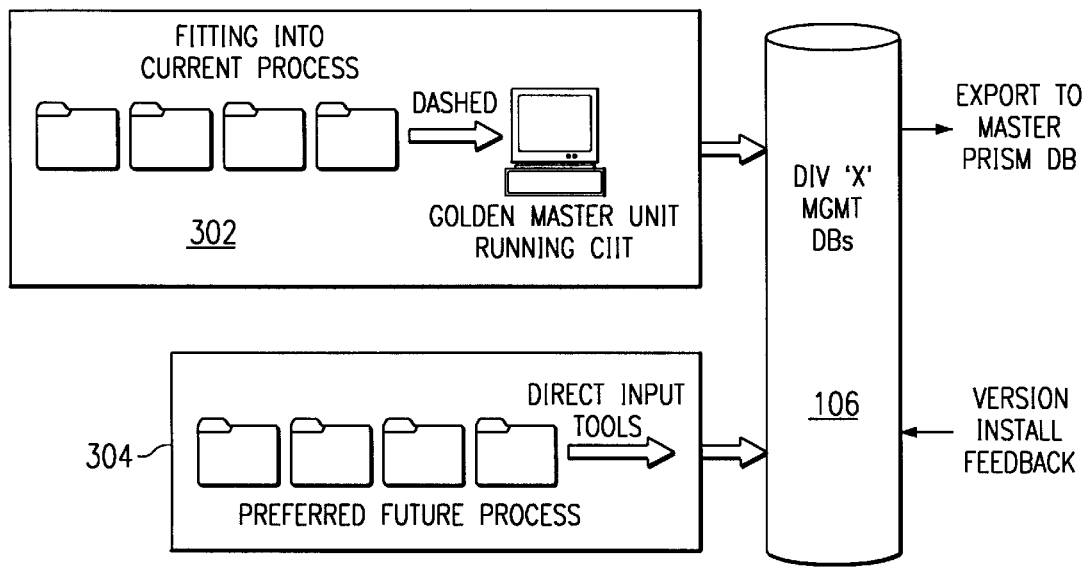
FIG. 3 shows a block diagram of the method by which software may be released into the novel computer manufacturing software download distribution system.

FIG. 3 illustrates, in block diagram form, two methods by which software may be released by software engineering groups into the software distribution system in a manner conforming to the ERDs described above. These methods are more fully described in Ser. No. 09/070,603, filed simultaneously herewith.

FIG. 6 illustrates the method by which the rules are released by various software engineering groups into the rules base network. This method is more fully described in Ser. No. 09/070,431, filed simultaneously herewith.

FIG. 1 shows an architectural overview in block diagram form of the hardware, interconnectivity, and data distribution flow preferably used to embody the novel computer manufacturing software installation and tracking system. This system is designed to provide efficient software distribution, configuration, installation, and tracking of software and hardware. The software distribution and installation system allows for release of software by one or more software engineering groups 102, each with its own development schedule, into a database network 104 which eliminates any duplicate files which may exist between groups and between versions of software released by the same group. The resulting database and software files are distributed to various master database servers at remote manufacturing facilities 106. From these master databases, software is distributed to one or more local databases and their associated servers 108 for download onto personal computers in either a predetermined ("as configured"), build-to-order, or configure-to-order configuration. In parallel with the above described distribution of software files, rules for the configuration of the software are created and distributed, again by one or more software engineering groups 102, through the configuration and tracking system. The product configurations are released into a separate database network 110. The resulting information is distributed to various CCP databases residing at remote manufacturing facilities 112. Once both the software and configuration rules have been distributed to the manufacturing facility, software pre-installation can commence. The process communicates with the product configurations database 112. The product configurations database 112 holds information concerning configurations for particular assembled units and hard drives as well as the rules for configuring new units and hard drives. A process is run at the manufacturing facility on a client station 114 which accesses the product configuration database 112 and allows a hardware and software configuration list to be created or changed if it already exists. This process also references and enforces the rules of hardware and software configuration contained on the database 112. Once a configuration list has been created, the assembled unit (or raw hard drive in a surrogate machine) 116 is connected to the network. A separate process running on the assembled unit 116 accesses the product configuration database 112 and retrieves its configuration list. The process then accesses a local software database 108 and commences the actual download of information onto its hard drive. Once the software has been downloaded successfully, diagnostic checks are performed on the assembled unit 116 and product configuration database 112 is updated to reflect that a software pre-installation has taken place for the particular machine 116. The configuration list for the particular machine can then be used as "as built" data. This data is transmitted back to a database network 118 at manufacturing headquarters. This "as built" information can then be distributed to customer service systems 120 including service centers 122 which can rebuild a customer's hard drive based on the "as built" information. The information can also be used by royalty tracking systems 124 to ensure appropriate payment to third-party software providers and configuration and failure analysis systems 126 to evaluate diagnostic, download completion, and other data related to software pre-installation.

First, the assembly process for PCs to be pre-installed with software will be described. Next, the server and database architecture at the remote manufacturing facility will be discussed in detail. The servers utilized at the remote manufacturing facility are distinguishable from common LAN servers. The servers used in this process support database storage and the DBMSs which manage the data. The servers also provide processing in the form of executables which retrieve and manipulate data from the server's local database or from the databases of other servers.

Next, the security features of the CCP and PRISM database tables will be discussed. Finally, the storage of "as-built" configurations will be described in detail in this application. The ERDs which describe the hardware and software configuration rules portion of the CCP database server information used during the software pre-installation process are described in detail in P-1552-2.

Assembly Process

FIGS. 8A–F depict a flow diagram of the CCP Client Program. The CCP Client Program is used to create a record of the hardware that constitutes a particular assembled unit. It is also used to designate software that is to be installed on the assembled unit before it leaves the manufacturing facility.

A system build begins with the CCP Associate bringing the picked materials for the new system to a CCP Assembly Cell. The CCP Client Program displays a dialog prompting for a chassis serial number.

The chassis serial number is the identifier for all configurations, so all operations in the CCP Client program begin with the entry of this alphanumeric string (Step 802). The serial number is used to query the configuration table in the CCP database (Step 804).

If a configuration record exists a menu of options are displayed. The exact options displayed depend on the authorization rights of the user. As in most systems, some users will have the rights to make more extensive changes. For the purposes of explaining the functionality of this process, no distinction will be made between the roles of the users.

If the configuration record is found, a check is made to determine if the system has been marked as shipped (Step 806). It is important to protect the integrity of the system configuration information. If the unit has been shipped, then the options available for most users will be to display the system configuration information without any ability to change it.

A few users will have the rights to remove the shipped designation. This will allow changes to the non-Compaq portion of the configuration, such as third-party hardware and software information, the ROM version, or capturing the image from the assembled unit. It will also enable a specific class of user to "unlock" the manufacturer's portion of the configuration.

In an "unlocked" state, all of the configuration information is open for change, except for the identifying chassis serial number. This includes changing the COA, the user registration information, the manufacturer's sub-assembly information, and the selected software information. Changes to any of this information will force a new software download. All of the change dialogs are similar to the new system dialogs that will be described in the following paragraphs.

If no configuration record is found, a series of dialogs are displayed. The user has the ability to move forward and backward through the dialogs.

The first information requested about the new configuration is the manufacturer's sub-assembly information. The part-number of the chassis of the machine to be assembled is entered first (Step 808). The part number and serial number for each major hardware sub-assembly is then captured (Step 810). This includes the keyboard. Each sub-assembly must be assigned a drive bay or card slot during the capture operation.

The particular ROM version to be installed in the assembled unit is then selected (Step 814).

Next, software selection can be performed through components or from a previously configured image (Step 816).

Component selection (Step 818) allows the user to select specific software packages. Hardware dependent packages are selected by rules written by the division CCP Knowledge Engineer. The rules are written for each product BOM and are executed automatically when the selection dialog is completed.

An image load (Step 820), on the other hand, allows for no component selection. Images contain all the drivers and application packages. The user may select from a list of images for the specific hardware platform. The images are captured at the end of a system configuration.

All system builds require that a Certificate of Authenticity (COA) number be entered (Step 814). The COA is an integral part of the royalty tracking requirements that the manufacturer must meet in its licensing agreement with Microsoft. The COA also identifies if there will be a software download.

A special COA will be entered if the unit will not have an operating system loaded in its primary partition. This number will bypass the software selection dialogs that would normally appear next.

If a normal COA number is entered, the user registration dialog is displayed. Three pieces of information are captured here: regional settings, user name, and company name. This entry of this information is optional, and if bypassed by the user, default information from the CCP Site options will be used.

When the above information has been entered, the user is asked to connect the assembled unit to the network (Step 822) and insert a download diskette (Step 824). The program that executes on the assembled unit makes a connection to a server-based program that has access rights to the CCP database. The configuration record for the assembled unit is queried, and if it is waiting for a download, an indicator will be returned that will allow the download to commence (Step 826).

Once the download has completed successfully, an image of the assembled unit's hard-drive can be captured (Step 830). Capturing the image of a newly prepared assembled unit enables successive machines which have the same hardware and software configuration to be prepared quickly. The image of the hard drive is used instead of choosing each piece of software to install on each unit. If no image is captured, or after the image has been captured, third-party hardware (Step 832) and third-party software (Step 834) can be added to the unit by the remote manufacturer. Once the assembled unit is complete, the user readies it for shipment and marks the unit as shipped in the database. (Step 828).

When the user acknowledges the CCP Client download dialog, the chassis serial number dialog will display. The CCP Client station is ready to build a new configuration or to modify an existing one.

PRISM and CCP Architecture at Remote Manufacturing Facilities

Figure 11:
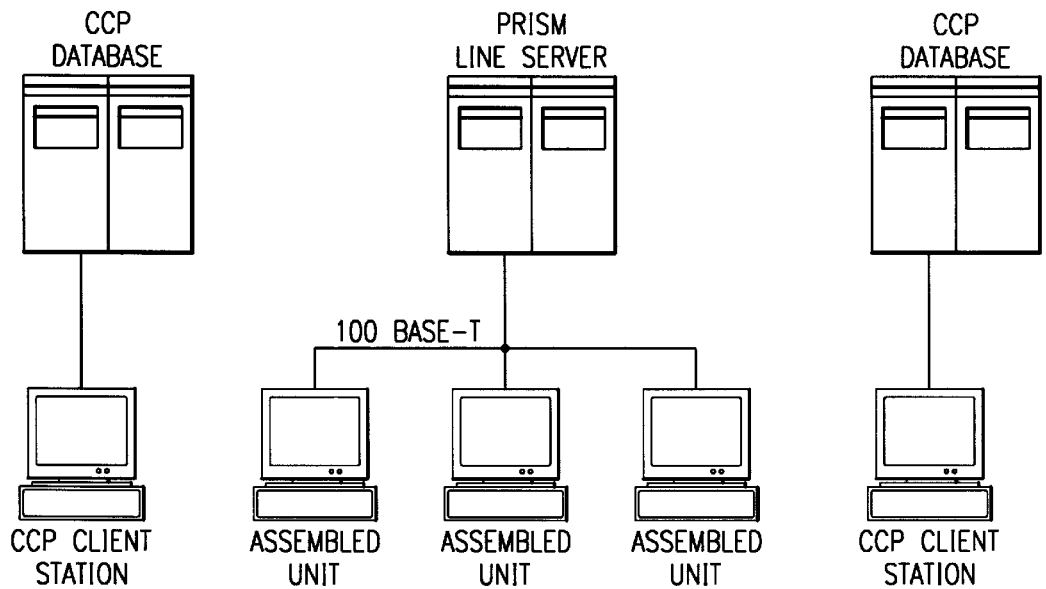
FIG. 11 shows a block diagram of the system architecture of a cell build installation process.

Two types of environments exist for computer assembly and software pre-installation at remote manufacturing facilities. FIG. 11 depicts one of the assembly environments known as "cell build".

The cell build scenario assumes that there are discrete areas were a CCP Associate will assemble hardware sub-assemblies into computer systems. In this area there will be several network drops to connect assembled unit's to the PRISM Line server for software download.

In addition to the assembly area, there would also be a CCP Client Station that is running the CCP Client Program, which is described above. The CCP Client Program runs on a machine connected to a network which provides access to both the CCP database, for accessing configuration rules and saving configuration information, and the PRISM database for access to the software download process. This station would have a barcode scanner attached that would be used to scan the part numbers and serial numbers from the hardware assembles into the CCP Client Program.

An Assembled Unit build would proceed with the following steps:

The computer sub-assemblies, including the base model chassis, would be brought to the cell area.

The chassis serial number is scanned at the CCP Client Station.

The sub-assembly part numbers and serial numbers would be scanned at the CCP Client Station.

A COA number, user registration, and software to be downloaded are entered at the CCP Client Station.

CCP Associate assembles unit and connects it to the network. In the cell build scenario, this network is the same as that used by the CCP Client Station. The network needs to have a high enough bandwidth to handle software downloads from the PRISM database to several assembled units at once. Currently the network uses 100base-T connections.

A CCP Access Control diskette is inserted in the unit and the system is powered on.

The diagnostic and software download occurs automatically. Diagnostics and software configuration begins after the download complete.

CCP Associate adds 3rd-party hardware and configures 3rd-party software.

If this is the first unit built for an order, the CCP Associate will insert a CCP Access Control diskette. The unit is booted. The CCP Associate enters a description of the image. The contents of the Assembled Unit are saved in the PRISM Line server database.

The unit is packed and shipped.

Figure 10:
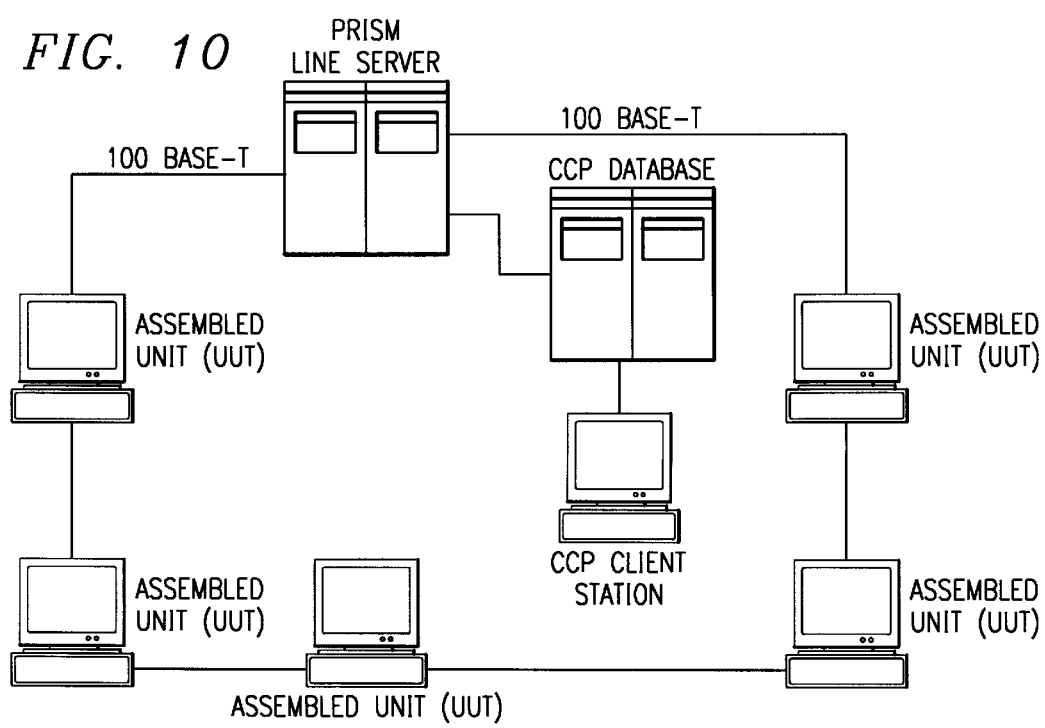
FIG. 10 shows a block diagram of the system architecture of a two-stage build installation process.

FIG. 10 depicts another of the assembly environments known as the "two-stage build". In the two-stage scenario, the software image for an order is prepared in a separate area from where the remainder of the order is built.

In the first stage of the build, the first unit built for an order is done in a non-production software load area. This area could be structured similar to the Cell build approach described above. The focus at this stage of the process is to prepare a software image that will be used for the software download in the remainder of the order.

All of the steps defined in the Cell build would then be performed.

In the second stage of the build, units 2 through n are built. The following steps are performed during this stage of the order processing.

CCP Associate brings sub-assemblies for a new build to a CCP Client station.

The chassis serial number is scanned.

The sub-assembly part numbers and serial numbers are scanned.

A COA number, user registration are entered, and an image description is selected from the catalogued images.

CCP Associate assembles unit and connects unit to network. The network used during this stage of the build can be completely separate from that used in the first stage to build an image.

Third-party hardware is installed and configured.

A CCP Access Control diskette is inserted in the unit and the system is powered on.

The diagnostic and software download occurs automatically. Diagnostics and software configuration begins after download complete. There will be no real software configuration since a configured image is used.

All the units built are packed and shipped.

Alternative Embodiment—Split Servers with Differing Bandwidths

Even though only transaction logs and changed files are moved across the PRISM network, the volume of data is quite high. When coupled with the network traffic involved in pre-installation of software, the amount of information exchanged demands high bandwidth connections.

The amount of network traffic on the CCP network is much less than that of the PRISM network. Only the software choice lists for a given model of computer need to sent across the network from the CCP server to the configuration software. This is a minimal amount of information. The software choice list produced by the configuration software is sent back to the CCP DB for storage.

Software Download

Figure 5A:
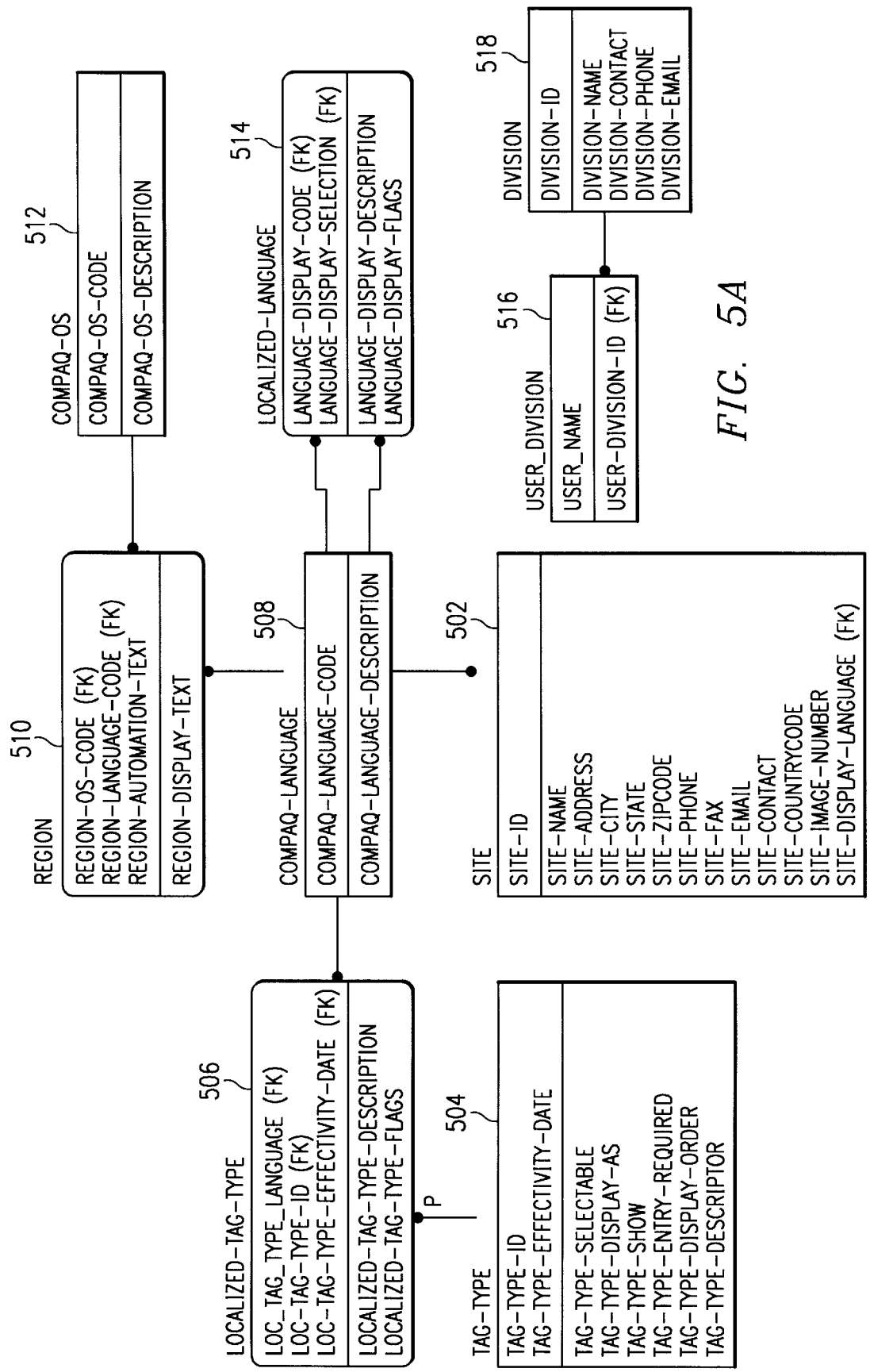
FIGS. 5A–C shows an Entity-Relationship Diagram which describes the relational database structure utilized in the rules based software configuration process.
Figure 5B:
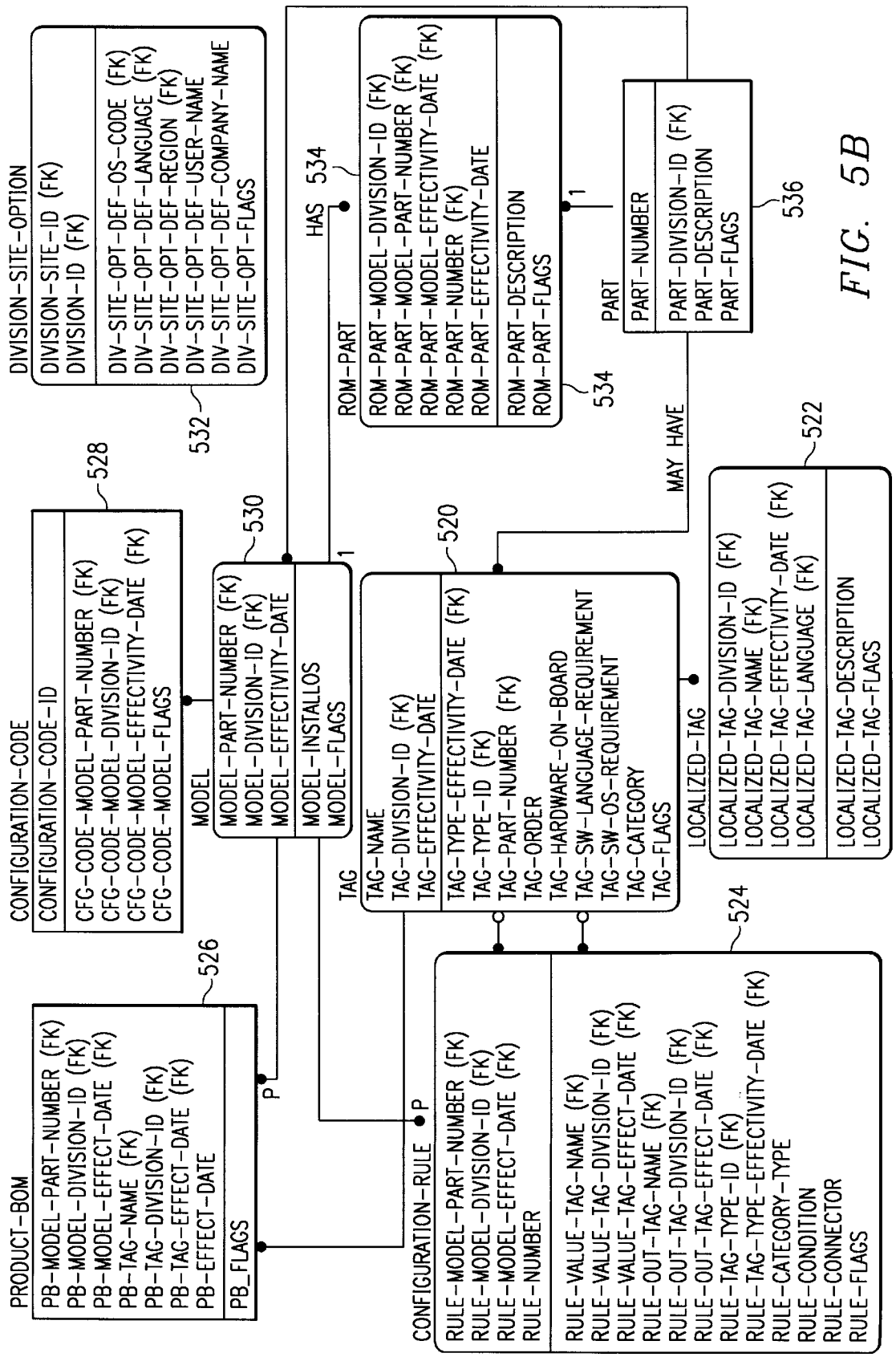
Figure 5C:
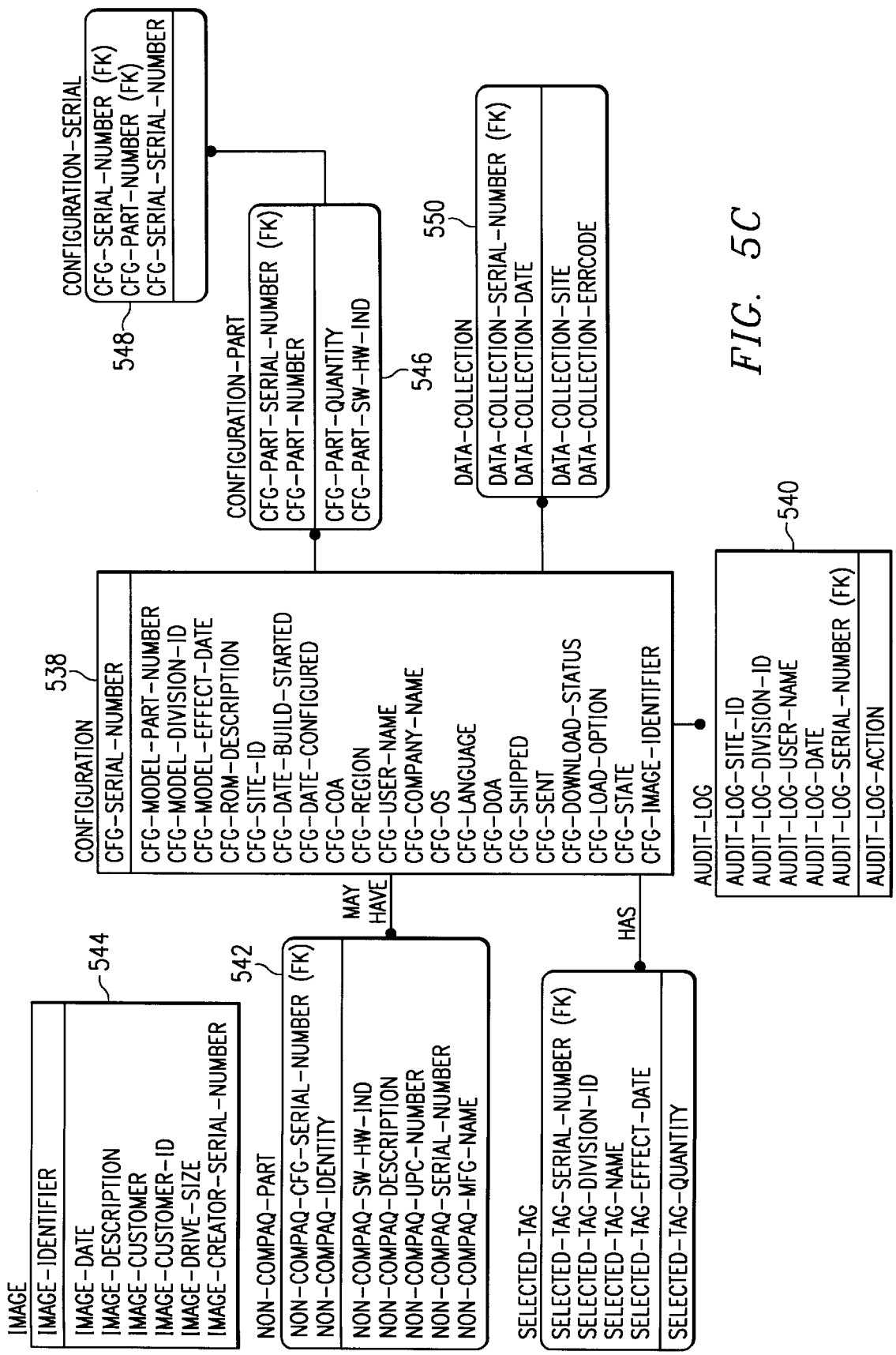
Figure 8A:
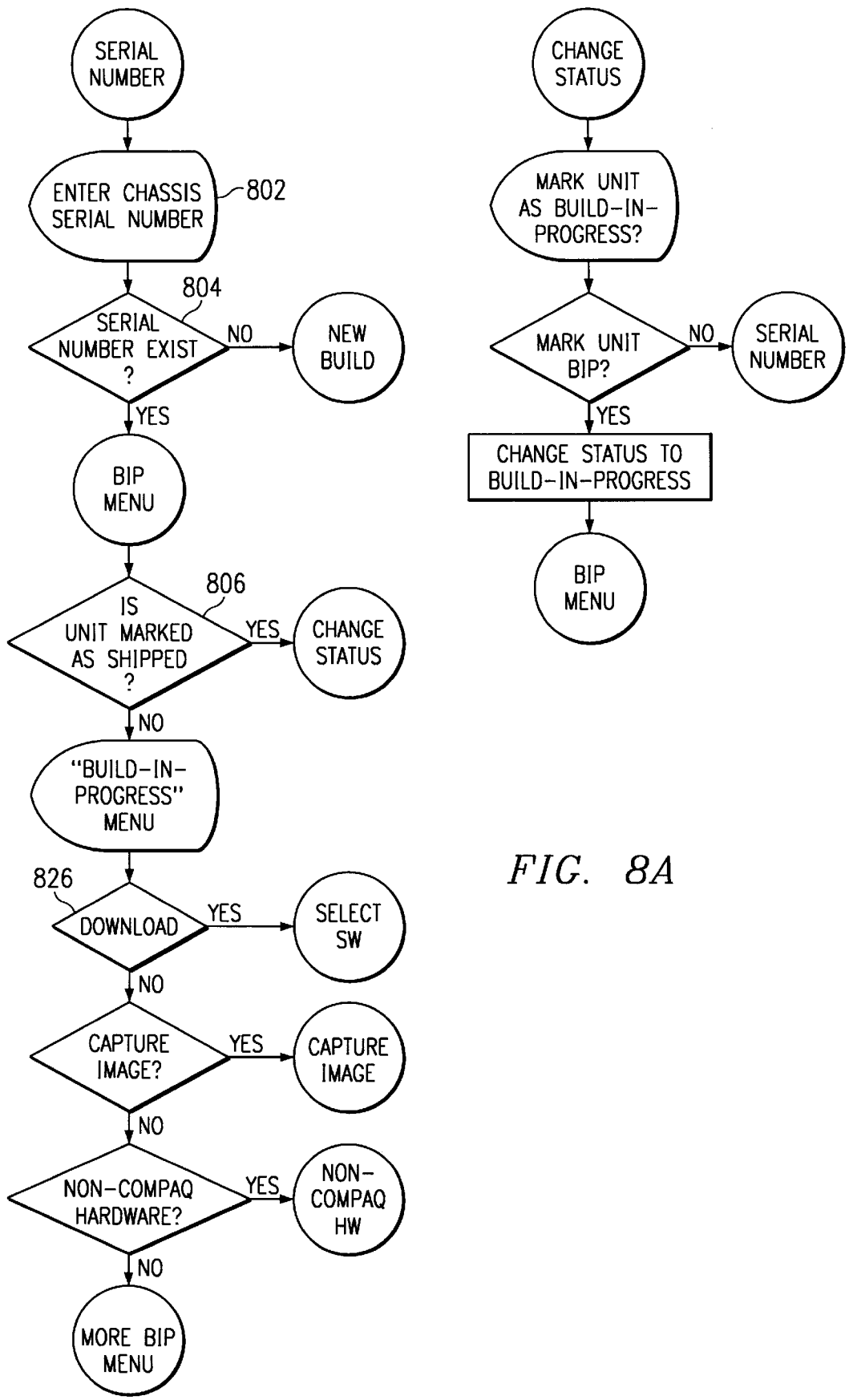
FIGS. 8A–F shows a flow chart of the hardware assembly, software selection and installation process.
Figure 8B:
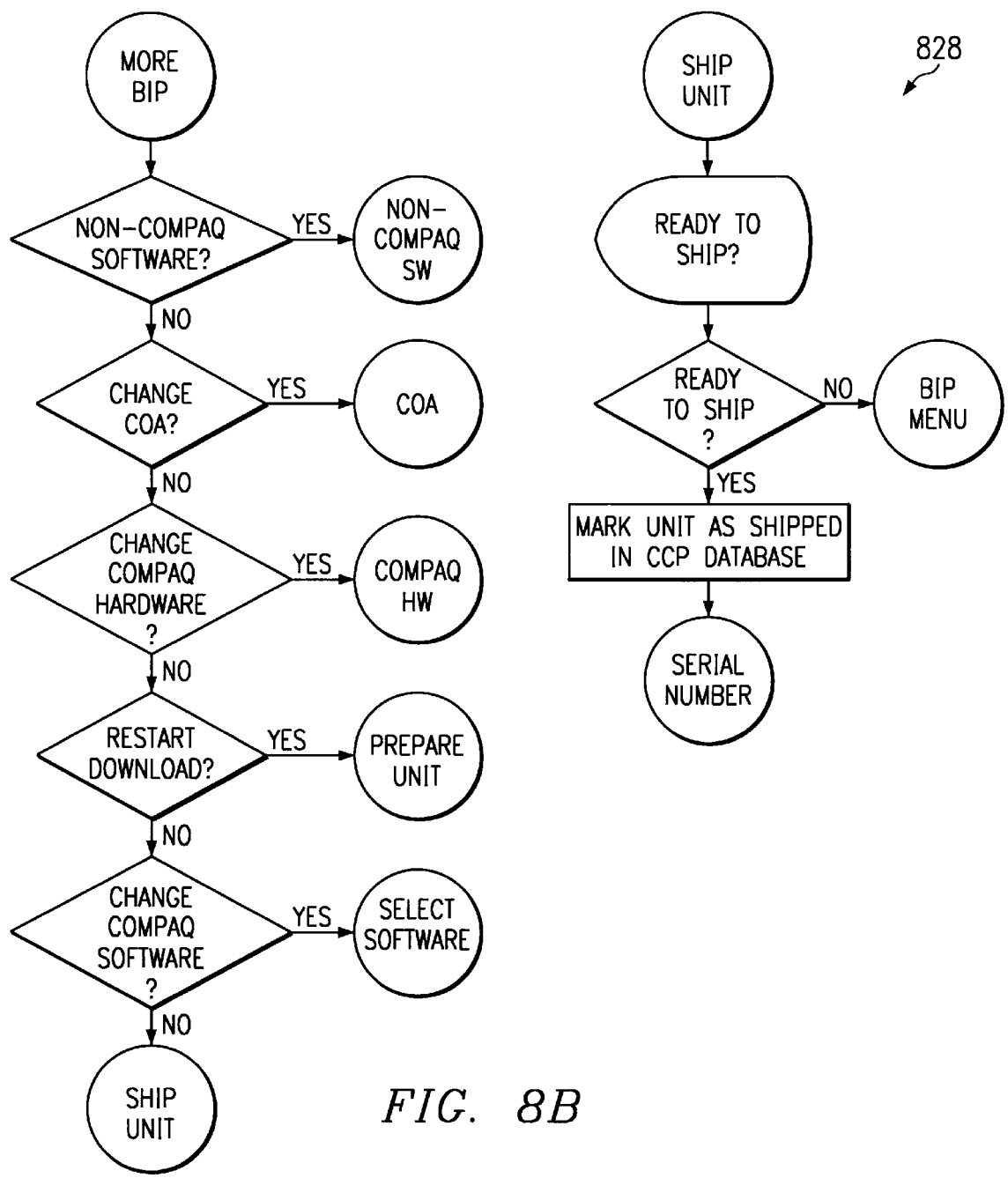
Figure 8C:
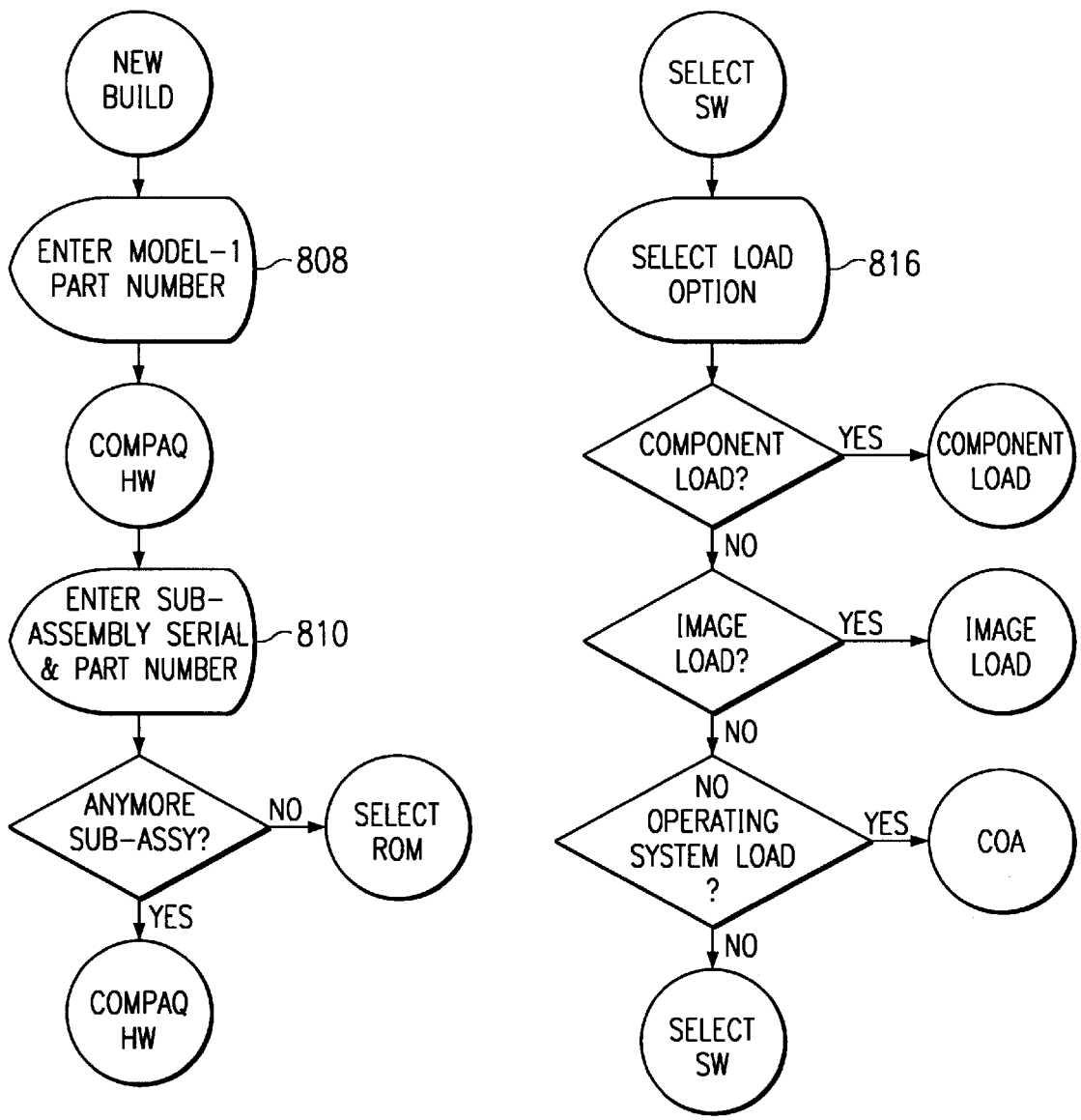
Figures 8D, 8E:
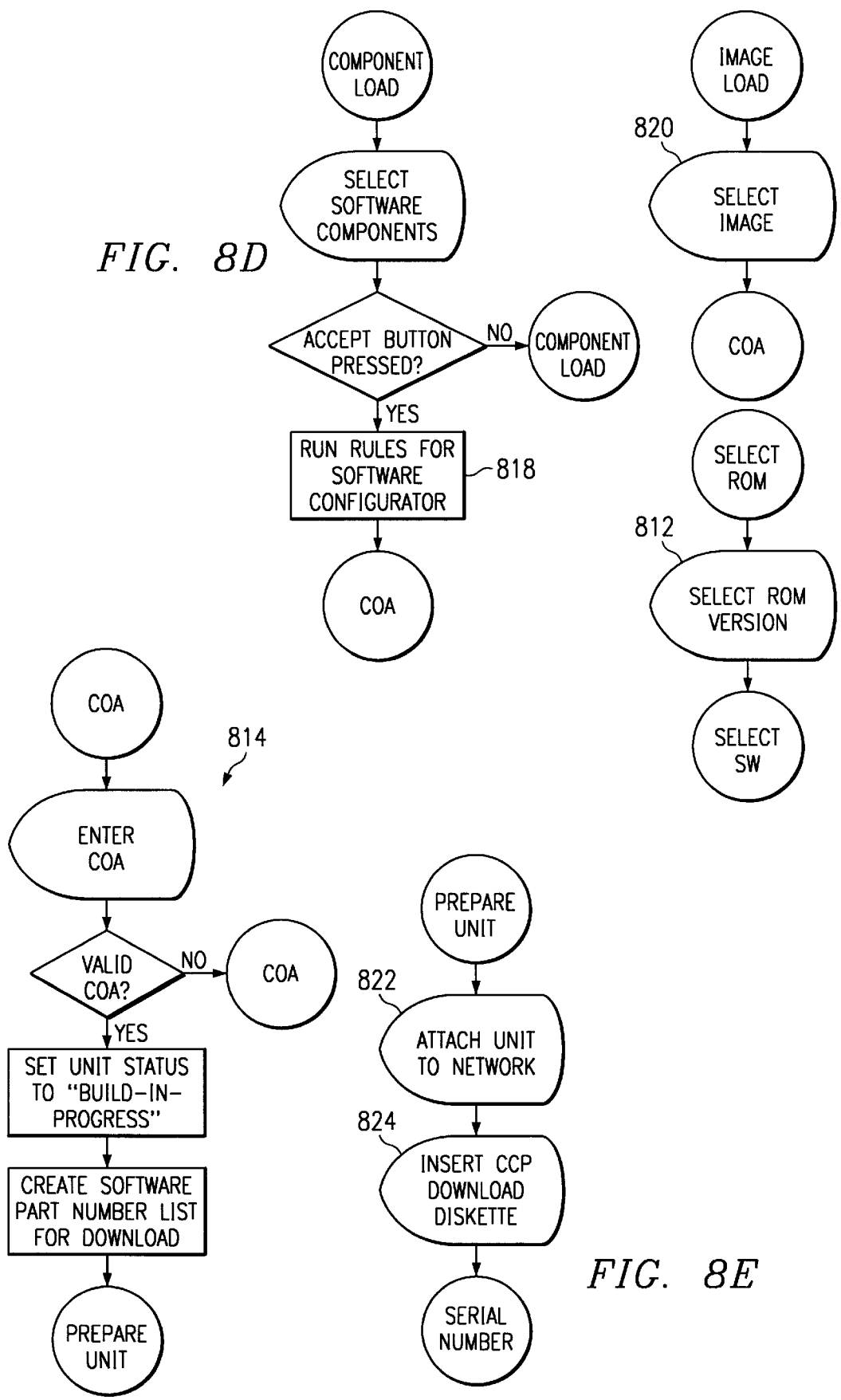
Figure 8F:
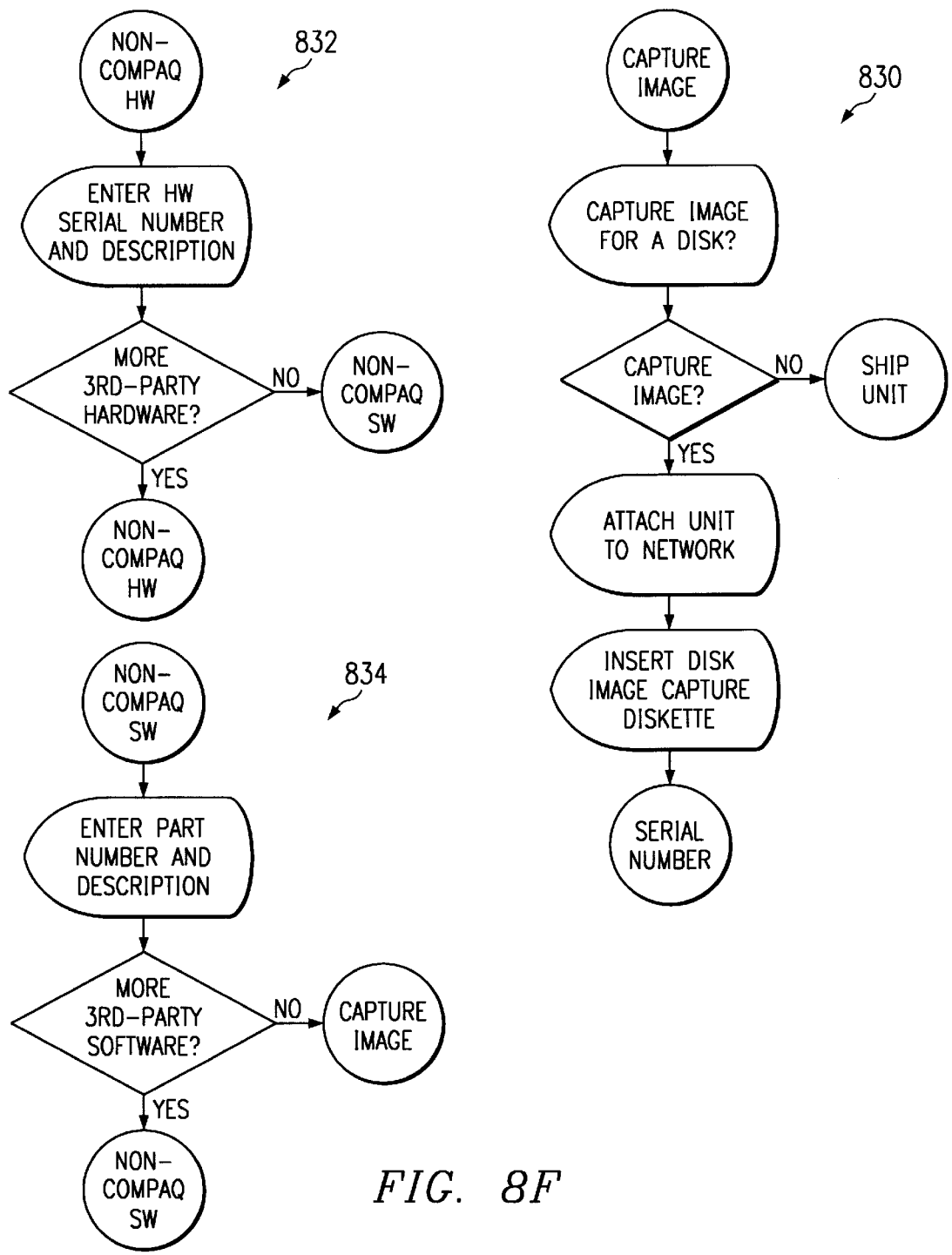

FIGS. 5A–C show the ERD which describes the relational database structure utilized in the preferred embodiment. The ERD defines to the DBMS how the data will be retrieved, deleted, added, and updated in the software distribution system. The ERDs are more fully described in Ser. No. 09/070,431, filed simultaneously herewith.

Figure 4:
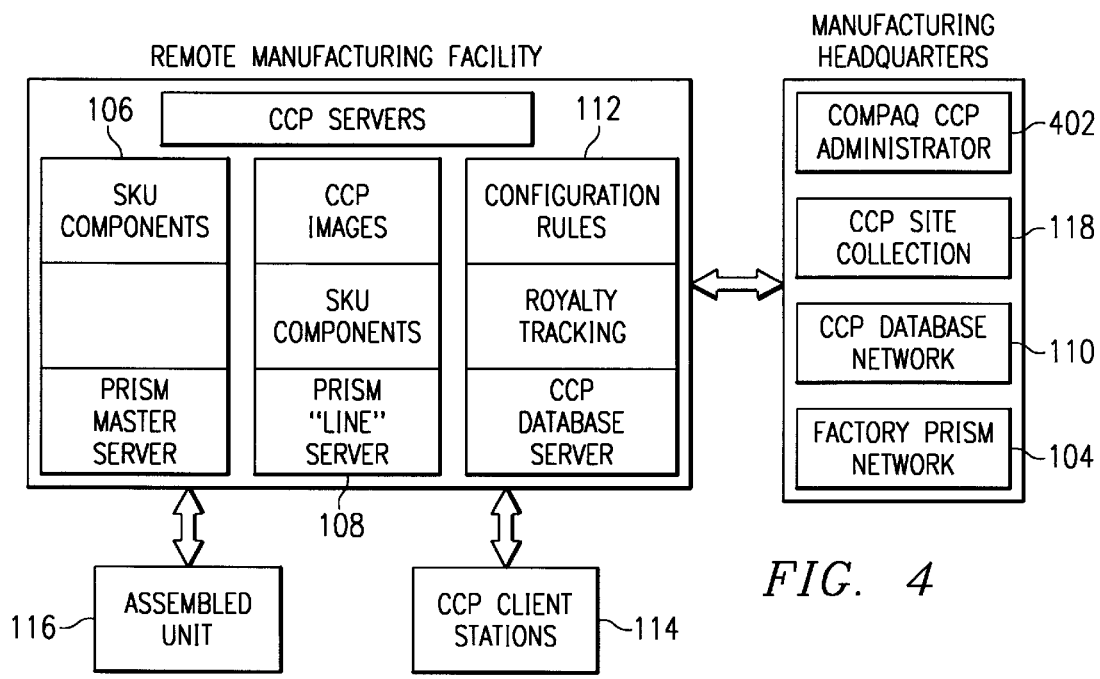
FIG. 4 shows a block diagram of the architecture supporting the software pre-installation system.

FIG. 4 depicts a block diagram which represents the connectivity between the CCP database, the PRISM database, the CCP Client Station, and the assembled unit. Also shown is the connectivity between the CCP and PRISM databases and the manufacturing headquarters or data collection and distribution point.

| | |
|---|---|
| Factory PRISM Server | A repository for SKU Components. |
| SKU Components | Software deliverables used during the software download process. The deliverables are configured on the assembled unit. |
| Local PRISM Server | A repository for locally generated hard disk images. |
| CCP Images | Fully configured system images are captured and stored in the |

-continued

| | |
|---|---|
| | CCP database for use when building additional copies of the same computer model. |
| CCP Database Server | The physical server that contains the various databases required supporting software tracking and downloading at the CCP site. The CCP database maintains information about systems built and the software installed on those systems |
| Royalty Tracking | A segment of the CCP database responsible for counting the software deliverables installed by a CCP. |
| Configuration Rules | A segment of the CCP database responsible for storing the configuration rules for hardware and software components. |
| Assembled Unit | The computer system assembled from supplied parts, and built at the CCP site. |
| CCP Client Stations | One or more stations at the CCP site that executes the program used to record information about a assembled unit. |

The CCP associate uses a process called the CCP Client Program, described above, to create a list of the hardware and software to be installed on the assembled unit. This list is used by the PRISM database in the software download process. It is also used by the manufacturer to keep an "as-built" database, implement royalty tracking of software, and quality control and customer service purposes. The CCP Client Program defines an assembled unit's configuration for the CCP Software Download System. The configuration must be fully specified before a software download can occur for the unit. A configuration includes: manufacturer's hardware, manufacturer's software, the product identification (COA) number for the operating system used, user registration information, and any third-party hardware and software that is added to the unit by the remote manufacturing facility.

The CCP Client application is run on a CCP Client Station. Once launched, the user is prompted to enter their user name and password.

This information is verified against the list of valid users before access is granted to the system. In the event that the login information is invalid, an error message is displayed. The user should reenter the information, or contact the system administrator to receive access to the system. A valid logon displays the main window of CCP Client, and prompts the user for the action to take.

The user may select three options: define a new configuration, open an existing configuration, or display status on existing configurations. Alternatively, the user may elect to Cancel" out of the dialog and make selections through the main menu bar. FIGS. 7A–C depict input windows for hardware and software component selection. These windows are described more fully in Ser. No. 09/070, 431, filed simultaneously herewith.

New Configuration

Selecting the New Configuration option prompts the user to create a configuration from input into CCP Client or via an external file.

If Create from file is selected, the user will be prompted for the file location and name. Manual entry begins with capturing the serial number for the unit and selecting the model part number for the unit.

The Serial Number determines the list of valid model part numbers for the unit. It may be scanned or entered manually. The serial number must be twelve characters and the edit field in the dialog will insure that the correct number of characters are entered.

The serial number is used to identify the configuration in the CCP system. The Model Part Number Description reflects the selected model part number.

Manufacturer Hardware Definition

The Manufacturer Compaq Hardware definition includes the hard drive, additional memory modules, cd-rom drive, modems, and any other manufacturer supplied option. The serial number and part number must be entered for all manufacturer hardware options. Error checking is in place to ensure that only valid hardware options can be selected for a particular model number. As the options are entered they are stored in the window displayed above with a description of the part. This description can be used as a visual reenforcement that the correct item is being recorded.

There is no limit to the number of parts that can be entered. When all options have been identified, the user will complete the dialog by selecting the Next button. Selecting Next will advance to the manufacturer software specification.

Manufacturer Software Definition

There are two methods for defining manufacturer software:

The Components option allows individual specification of manufacturer software options, and will most likely be used for individual orders.

The Images option allows selection of a historical download. This option will most likely be used for large volume orders, or for reoccurring orders for identical hardware. Note: Currently the Images option is currently disabled. Select the Next button to specify the individual software selections for a component load.

This dialog is constructed from information supplied in the hardware dialog, and from information in the CCP database that defines the valid software choices for the type of system being built. This information is combined to create selections for the language version of software, operating system, and applications. The Language version selected will determine the Operating System selections available, and the language and operating system will determine the Applications available. Software drivers for the defined hardware are selected automatically once the language and operating system have been selected. These are not currently displayed.

Software and Hardware Dependencies

Some software selections are performed for the CCP Build Associate. This selection is controlled through a set of rules. These rules are written for each base model system by the product division. The rules describe hardware and software dependencies, and software and software dependencies. For example, video hardware typically requires specific versions based on the language version of the operating system choice. In this case, a rule would be written that would select the appropriate driver based on the user's language and operating system selection. Selecting the Next button completes the software selection dialog.

Certificate of Authenticity

Each operating system requires a Certificate of Authenticity number, sometimes called a product identifier.

The COA dialog requires that the user enter the number in a specific sequence. The number contains self-checking information that is used to verify that the numbers entered are correct. An incorrect number will cause an error dialog to display, requiring the user to re-enter the number. A valid COA must be entered before any additional information can be entered.

Following the COA dialog is an end-user registration and preferences dialog. This requests a user preference for the operating system regional settings, end-user name and company name. Each of these selections defaults automatically to a site defined set of values. The CCP Build Associate may simply press the Next button to accept the default values.

At this point, all manufacturer information has been defined. The CCP Build Associate may change any of the information already entered, or continue on to enter optional third-party information. By selecting Next, the user is given the option to specify third-party hardware.

This information is optional. After this dialog, the user has the option to specify third-party software options.

The configuration should now be saved. Select Save from the Configuration menu. Since the manufacturer information has been fully defined, the system is now enabled for software download.

Import Files

The configuration created by the CCP Client Program can also be created manually using a text editor or by a more simple software process. Each text file created instructs the configuration and download system in a different operation.

The CCP File Import Program is used to define "As built" configurations in the CCP Software Download System and to set configuration status for units that have shipped and units that are sent back to the manufacturer. This program runs unattended on the CCP server.

The CCP Import Program accepts specially formatted text files as the means of defining the "as built" configurations. These text files use commands to identify the unit serial number of the system being configured, manufacturer hardware and software, a language version and operating system choice, the operating system Certificate of Authenticity (COA) number, user preference information, and third-party hardware and software options. This information is recorded in several SQL tables in the CCP database.

The program is organized as a main program (console application), a dynamic link library (DLL) with the process code, and one or more resource-only dynamic link libraries used to support messages in multiple languages. Other programs, such as the CCP Client utilize the process DLL to create configurations in the CCP database.

The main program is responsible for searching a shared server directory for configuration files. When a file is found, a call is made to the process DLL with the name of the file. The process will return a pass or fail indication. If the configuration request fails, a text file is created with the error code and message in it. These messages are localized based on the setting of the default language for the server. The error messages are written to a file with the same name as the import file, but with a different extension.

The process DLL begins execution by identifying the correct resource DLL to use and has that DLL load. Any warning, informative, or error messages written to the error file for the configuration are localized to the site.

At this time, connectivity is established to the CCP database. All table accesses are made through this connection. A program log file may also be created if a command line parameter has been specified. The program log will record SQL commands issued, any database error messages returned, and any program level error messages.

After the initialization phase, the process DLL begins by reading the import configuration file and storing the contents in memory objects. These objects are accessed during the processing of the configuration by other elements in the process DLL.

Configuration rules are checked as the contents of the file are read. Parse error messages will result if the syntax of a command is violated. The error messages are written to the error file for that configuration, and the processing of that file is terminated. Control returns to the main program. The next configuration file is passed to the process DLL.

Six different build and status change scenarios are supported: Build a new system, update an existing system, build a no operating system configuration, update a no operating system configuration, set the status for a configuration indicating the unit has shipped, and setting the status for a configuration indicating that the unit does not function ("dead-on-arrival") status.

The build and update scenarios begin by mapping the four character configuration code embedded in the unit serial number to a base model part number in the PART table. The part number is used to locate a model record in the MODEL table. This record contains information about the software load options available for the unit.

A test is made initially to determine if the configuration already exists. If it does, additional checks are performed to determine its ship status, dead-on-arrival status, and operating system load requirements.

Some models, as it will be explained later in this document, can not receive any user software. This includes the operating system, and some must have the user software downloaded to the unit. If the model being configured is a No Operating System model, the New and Update scenarios will be described in another section in this document.

Building a new system

This is the most involved of all the configuration scenarios. A full configuration is created from the parsed contents of the import file. This scenario is executed when a configuration with the same unit serial number does not exist.

A new build configuration record is created and initialized to default values. For date fields, a NULL is used. The unit serial number and the part number associated with the base model unit is saved in the build configuration record.

Next, the site identifier for the CCP site is read (e.g., from D:\FSDASH\CCP\SITE.INI). This value is written to the build configuration record. An error occurs if the SITE.INI file can not be found.

The language and operating system version is checked next. These values must be specified for a component software load, but they are ignored for an image load.

If an image load is specified, the image identifier is used to retrieve the record from the IMAGE table. The creator's unit serial number is part of the IMAGE record. This serial number is used to read the original configuration record, and the language and operating system values in that configuration are copied to the new configuration. If the image identifier is invalid, an error is written to the error file for the configuration and the build phase is terminated. If the original configuration record is not found, the language and operating system values are left blank, and the build phase continues.

If the software is loaded from components, the language and operating system versions are retrieved from the import file values. If these are not specified, an error is written to the error file for the configuration and the build phase is terminated.

The values are then checked against the Product BOM for the unit to ensure that they are valid selections. If the combination is not supported by the model, an error is written to the error file for the configuration and the build phase is terminated. If the values are valid, they are written to the build configuration record User preferences and registration information is optional in the import file. If it is not specified, the values in the DIVISION_SITE_OPTIONS table are used. If these values cannot be read, an error is written to the error file for the configuration and the build phase is terminated.

The regional settings value from the import file is checked against the valid values in the REGION table. If the setting is not correct for the language—operating system selection, an error is written to the error file for the configuration and the build phase is terminated. The valid values are copied to the build configuration record.

If a Microsoft operating system is loaded on a system, then a Certificate of Authenticity number is required. If one has not been specified in the import file, an error is written to the error file for the configuration and the build phase is terminated.

Each COA is validated against a Microsoft-supplied algorithm. If the number entered is invalid, an error is written to the error file for the configuration and the build phase is terminated.

If a COA is supplied, and if it is valid, then an additional check is made in the CCP database to insure that it is not currently assigned to another configuration. If another configuration is currently using the COA, an error is written to the error file for the configuration and the build phase is terminated. The valid COA is written to the build configuration record.

Due to the referential integrity checks in place between the CONFIGURATION table and its reference table, the partial build configuration record is written at this time.

At this time the core information for a configuration has been processed. The remaining information deals with the manufacturer's hardware and software and third-party hardware and software.

Multiple manufacturer hardware options may be specified in a import file. These include, but are not limited to, a hard disk, additional memory, and a CD-ROM. Options are identified by their part numbers. The part number must exist in the PART table. If it doesn't, an error is written to the error file for the configuration and the build phase is terminated.

The software configuration rules discussed later in this section are dependent on TAGs. These TAGs are stored in the SELECTED_TAG table. The hardware option part number must be converted to its associated TAG. A search is performed in the TAG table for a TAG with an option part number. If one is not found, an error is written to the error file for the configuration and the build phase is terminated.

Once a TAG is found, the PRODUCT_BOM table is checked to insure that the hardware option identified by the TAG is valid for the base model. If the hardware option TAG is not found in the PRODUCT_BOM table, an error is written to the error file for the configuration and the build phase is terminated.

A valid hardware option TAG is written to the SELECTED_TAG table. In addition, entries are added to the CONFIGURATION_PART and CONFIGURATION_SERIAL tables if both a part number and serial number for the option is available. If only a part number is specified, then nothing is written to the CONFIGURATION_SERIAL table. If an error occurs while writing to either of these tables, an error is written to the error file for the configuration and the build phase is terminated.

This process of validation and adding continues until all manufacturer hardware options have been processed.

The software load option is processed next. Two types of loads can be specified—components or image. Unit builds, where no software is loaded, is discussed later. Components and image load may not be specified at the same time. If they are, an error is written to the error file for the configuration and the build phase is terminated.

If an image load is specified, the image identifier is recorded in the build configuration record. This will be retrieved later during the software configuration rules evaluation phase and placed in the CONFIGURATION_PART table for use by the software download tools.

If a software load is required a process similar to the manufacturer hardware process is required. Manufacturer software options are identified by name instead of part number. These names are the same as the TAG names for the software deliverable. The valid software choices for a base model are available through the PRODUCT BOM Viewer, which is part of the CCP Client program.

The application description in the import file is used to locate the TAG with the same name. If a TAG cannot be found, an error is written to the error file for the configuration and the build phase is terminated.

Like manufacturer hardware, each software option must be part of the PRODUCT BOM. If it isn't, an error is written to the error file for the configuration and the build phase is terminated.

A valid TAG is written to the SELECTED_TAG table. These are used during the software configuration rules phase to create a list of software part numbers required during download.

Once all the manufacturer hardware and software has been processed, the third-party hardware and software options are copied to the configuration. The contents of this data are fairly freeform and no checks are performed on the data supplied. The information is written to the NON_COMPAQ_PART table. It is transmitted back to the manufacturer during the export phase for evaluation.

At this time the contents of the import file have been processed. The remaining step must create a list of software SKU Components needed during the software download phase. These components are identified by software part numbers. The components are stored in the PRISM database. The software part numbers are selected as a result of evaluating a set of rules. The rules look at the hardware options selected for the base model and pick the appropriate software drivers and support deliverables. In addition, any applications specified are converted to a software part number. The resulting list of software part numbers is inserted in the CONFIGURATION_PART table. A more detail discussion of the rule evaluation process can be found later in this document.

The software download status is changed to ready to download and all stored changes are written to the CCP database. This completes the build configuration phase.

Updating an existing configuration

The update scenario is executed when the configuration exists. The purpose of this scenario is to change some portion of the configuration. Everything may be changed except for the unit serial number, which is the identifier for the configuration.

Before any changes are allowed, the software download status is checked. If the status is complete, download started, or if the configuration is locked, then any changes are rejected and an error message is written to the error file for the configuration. The Program Messages section describes each of these messages.

It is assumed that when a change occurs to an existing full configuration, that the import file will contain the complete description of the system, instead of just the changes being made to the configuration. Before the new import file changes are made, the entries in the NON_COMPAQ_PART, SELECTED_TAG, CONFIGURATION_PART, and CONFIGURATION_SERIAL tables are purged of all entries for the unit serial number. There are several partial configuration options described in the following sections.

The configuration sent field is also cleared at this time so that a new copy of the configuration is sent.

The remainder of the update proceeds like a new configuration build.

Building a New "No Operating System" Configuration

Most base models require that an operating system be loaded, but there exists a capability to designate that some models will not receive an operating system. This does not mean that the unit will not receive software. The hidden (system) partition still requires that diagnostics be loaded.

The process is similar to a full build with the exception that language and operating system version, COA, and manufacturer software specifications are ignored in the import file. Manufacturer hardware, third-party hardware, and software entries are captured and written for the configuration.

Updating a "No Operating System" Configuration

This update makes many of the same assumptions that the full build update does. It will also purge the reference tables before processing the updated definition from the import file.

Setting SHIP status

A special scenario exists where a configuration exists, software download is complete, and all information has been specified. The unit is shipped from the CCP site. The partner needs to tell us this by submitting an import file with two records. One is the MOD1SN and the other is a SHIP record. This file will set the ship date for the configuration to the date specified in the SHIP record.

Errors can occur, and processing will terminate, if: the configuration identified in the MOD1SN record does not exist, more records are present than the MOD1SN and SHIP entries, the Download status is not complete, the configuration is not locked, the configuration has already shipped, there is no ship date specified in the SHIP record, the build date is after the ship date. If there is no errors, the ship date is written to the configuration record, the download status is changed to CONFIGURATION LOCKED, and the changes are written to the CCP database.

Setting DOA status

If a base model has a hardware failure, or has missing components, and must be returned to the manufacturer after a configuration has been created in the CCP database, the unit must be marked as dead-on-arrival. This will also clear the COA number so it may be used with another configuration.

This will also change the download status to incomplete, forcing a new software download if the unit should be repaired.

Configuration File Parser

The import configuration file parser reads the contents of the file and disassembles each line into a recognizable object. These objects are accessed during the configuration build phase. The module opens the file in text mode so that each read retrieves a single line. If the open fails, an error message is written to the configuration error file and the parse phase is terminated. Each non-blank line is composed of a record identifier, which describes the type of data contained on the line, and one or more parameters for the identifier. Each entry on a line is separated by a comma. The disassembly operation first locates the record identifier in an array of valid types. If the identifier is not found, an error message is written to the configuration error file and the parse phase is terminated.

The parameters are stored in internal objects. When a line has been completely disassembled, tests are performed to verify that the correct number of parameters have been given for the record identifier. If too many parameters have been specified, or if too few parameters are given, an error message is written to the configuration error file and the parse phase is terminated.

When all records have been record from the file, a check is made to insure that the file had at least one record. If no records were read, an error message is written to the configuration error file and the parse phase is terminated. The last task before the parse phase is complete is to build lists for manufacturer hardware, software, third-party hardware, and third-party software entries. These will be returned one at a time during the build phase. These lists store the position that the object has in the object array. If there are more than 50 objects in any category, an error message is written to the configuration error file and the parse phase is terminated.

Several methods are defined for retrieving the parsed information. Each of these will return TRUE if an entry is available, or FALSE if no entries are found.

Download of software cannot take place without this record in the CCP database. Since changes to the record must go through the DBMS to become effective, no changes or downloads can take place without access to the database, which creates an audit record.

The Download Process

Once the configuration is successfully created, the download process may begin. The software download process begins when the assembled unit is booted with a Software Download diskette.

CCP Media Program

This program implements the automated revision control system for the CCP Software Download Diskette.

The CCP Media program is tasked with detecting when the CCP Software Download diskette was created with a CCPBOOT.IMG file different than the active one on the CCP server. If the image is different than the diskette, the new image is automatically copied to the diskette, over writing the diskette's contents.

Since the image file only contains a generic image—one without the ability to connect to the network—a customization step must also be performed after the new image is copied to the diskette. The site parameters are contained in the CCPBOOT.INI file that is stored in the same directory as the CCPBOOT.IMG file. The values in this file are copied to the diskette, and the file is renamed to CCPCMD.INI.

If the CCPBOOT.IMG file is the same as the diskette, a second check is made to determine if the CCPBOOT.INI file on the server has changed since it was used to customize the diskette. If it has, the contents of the CCPBOOT.INI file is copied to the CCPCMD.INI file on the diskette.

Before the files on the diskette are replaced, a check is made of the CCPCMD.INI file. If the file contains the IMAGE indicator is set. The indicator is tested after the diskette is rebuilt, and if true, the IMAGE line is added to the CCPCMD.INI file.

The CCPCMD.INI file is also checked for the COMPAQ-DEBUG parameter. This is used by the Compaq test organizations to preserve settings in the CCPCMD.INI file when the image is replaced. If this parameter is in the CCPCMD.INI file, the contains of this file is saved before the image is copied to the diskette. The saved contents are restored after the image copy has completed.

Once the diskette has been fully built, the cyclic redundancy check (CRC) is computed on the CCPCMD.INI file, and the value is stored in the CHKFILE.TXT file. A CRC is also computed on the CHKFILE.TXT file and stored in the last sector of the diskette. See the appendix for the values stored in this sector. The system is automatically rebooted.

Downloading

The AUTOEXEC.BAT file invokes the CCP Access Control Program (ACP), which reads the serial number from the unit's ROM.

The ACP writes the serial number to the assembled unit's UIA. ACP invokes the PRISM Direct Software Download (DSD) program with command line options of -CCP and -X.

The -CCP option specifies that software components are to be read, regardless of the configuration code in the serial number. CTO units have a 'Z' is in the fourth position of their configuration codes. CCP option requires software components but the serial number does not contain any special encoding.

The -X option requests that the Revolution diagnostics be loaded during the software download process.

DSD passes the serial number to the CCP Server Control Program (CCPSCP) through a socket interface. The CCP-SCP supplies the functionality of the SFDM factory system. The CCP Server Control Program returns a list of software part numbers from the CCP database.

The download program accesses the PRISM database and builds the structure for an image of the assembled unit in a temporary database. When the image is constructed, the information is transferred to the assembled unit. Cluster by cluster the image is built in the memory of the assembled unit and written to the assembled unit's disk.

A "Ghost" partition is created on the hard drive and the diagnostic programs are stored in this partition.

PRISM will access the CCP Server Control Program through a WINSOCK interface to retrieve a list of hardware part numbers. The part numbers are written to a file that is stored in the "Ghost" partition for diagnostics use.

When the diagnostic control program executes, it will read this list of part numbers and translate them into one or more SCFs. If the list and the actual hardware installed are different, an error is displayed. If no errors are found, the software installation process continues.

The SDV (Software Download Verification) program is run to verify that the diagnostic programs did not corrupt the primary partition data where the SKU Components are stored. Next, a check is made in the C:\SYSTEM.SAV directory of the assembled unit for the REBOOT.ME file. If this file exist, the SDV program will reboot the system to allow CIA to run.

CIA will install, configure, and test the software found in the primary partition. If no errors are encountered, control is returned to the SDV program.

SDV will return control to the CCP Access Control Program (CCPACP). CCPACP will read the ERRCODE byte from the UIA of the assembled unit disk and write a record in the CCP database.

CCPACP will then display a message on the screen of the assembled unit indicating the completion status of the download. If an error occurred, the message is displayed on a background of red; otherwise, a installation complete message is displayed on a background of green.

The unit has completed the manufacturer software configuration phase.

Diagnostics

The diagnostic files will reside on the PRISM line server. Different versions may exist at the same time on the server, each version contained in its own sub-directory. The DIAG.MAP file may point to more than one sub-directory for a given configuration code. This file exists at a fixed location on the server and the PRISM download tools will read this file to determine the sub-directory (version of diagnostics) to copy to the UUT.

The distribution of the diagnostic files will be done over the same physical connection as other PRISM server files, but the exact process for moving these files is not defined at this time.

The System Component File (SCF) is created by the PN_XLATE process based on the settings in the PN_XLATE.INI file that is included in each diagnostics release. This file maps the hardware part numbers to a corresponding SCF, which describes the characteristics of a hardware sub-assembly that is tested by Revolution diagnostics.

The hardware part numbers are passed to the PRISM download tool through a SFDM interface that is similar to the SFDM system in use at Compaq facilities. The download tool will query this interface with the production order number (for CCP, this is the UUT's serial number) and a list of part numbers and their quantities are returned.

The PRISM download tool will write the part number and quantities to the CTOHW.TXT file. Each line will contain a part number, a comma, and the quantity installed. This file is written to the root of the "ghost" partition, and in the primary partition in the \SYSTEM.SAV directory.

When diagnostics executes, it will read the CTOHW.TXT file and do the translations through the PN_XLATE.INI file. The translated output is recorded in a single SCF.

CCP Access Control Diskette

The CCP Access Control Diskette (ACD) is the only network access diskette required for the assembled unit. A FLASH ROM diskette may be needed, but the ACD is the only one needed for accessing the CCP and PRISM databases.

The ACD diskette provides functionality for software download, and image capture. Additional functionality may be added in the future.

At boot, the network drivers on the diskette establish a network connection to the CCP Software Download System. Once the network connection has been established, the Access Control Program (ACP) is executed from the AUTOEXEC.BAT.

ACP will first verify that the unit is the manufacturer's system. If it can't verify this, an error is displayed and execution stops.

Next, ACP reads the serial number from the assembled unit's ROM and uses it as a key to the CCP database. Information from the unit's configuration record is read to determine the current configuration state of the unit.

ACP will invoke different functionality depending on the state of the assembled unit's configuration.

Automatic Diskette Update

The ACD performs a test each time it starts to verify that it is the latest version. If it is an order version than the image on the server, it will update the contents of the diskette.

CCP Access Control Program

The CCP Access Control Program (ACP) is the controlling program on the CCP Access Control diskette. ACP begins execution by verifying that the system it is executing on is the manufacturer's system. If it isn't then an error is displayed and the program will not continue.

If it is the manufacturer's system, ACP will log into the CCP database with a generic account. It next will retrieve the serial number from the ROM of the unit it is running on and use this as a key to get the download status for the unit from the CCP database.

The download status can be in four states: Configuration-Incomplete, Ready-to-Download, Download-Started, Download-Complete.

Configuration-Incomplete indicates that not all of the configuration information has been entered for the unit. A message is displayed on the unit's monitor. The CCP database is queried periodically looking for a change to this status.

Ready-to-Download status indicates that all of the configuration information has been entered, and the unit is ready to accept software. ACP will write the unit's serial number to the UIA area of the disk and invoke the DSD program with command line options of /CCP and /X. This will force the loading of software components and Revolution diagnostics on the assembled unit's disk.

Download-Complete status indicates that the unit has already received a software download. A message is displayed indicating that the download may not be repeated until a supervisor takes action through the CCP Client Program.

Download-Started status indicates that ACP is receiving control after a software download has completed. ACP reads the unit's UIA to retrieve the ERRCODE value. This records the completion status for DSD, SDV, diagnostics, and CIA. A data collection record is written to the CCP database with this value.

If the ERRCODE value indicates a FAIL condition, a message is displayed on the assembled unit. A red background is used for the message to give a strong visual cue that an error has occurred. ACP will also set the download status in the CCP database to Ready-to-Download.

If the ERRCODE value indicates a PASS condition, an installation complete message is displayed with a green background. ACP will also set the download status in the CCP database to Download-Complete.

CCP Server Control Program

The CCP Server Control Program (SCP) provides an interface between the PRISM and CCP databases. It does not attempt to replace all the functionality, but only the Revolution diagnostic and PRISM interfaces for retrieving hardware and software part numbers.

The CCP Server Control Program performs two primary purposes. The first is to provide an interface that can supply hardware part numbers to PRISM, which will create a file with the part numbers. The file is written to the "Ghost" partition. Revolution diagnostics will use the file for sub-assembly verification and testing. The second is to provide an interface that can supply software part numbers to the PRISM download system.

A request from DSD for part numbers is made by passing the serial number of the unit to a stored procedure. The stored procedure requests the part numbers through an interface on SCP, which queries the CCP database to retrieve a list of the part numbers designated for the unit. The part numbers are returned one at a time with each request from the stored procedure. When all have been returned, a table of part numbers are returned to DSD.

CCP PRISM Line Server

The CCP PRISM Line Server is structurally the same as a CCP PRISM Master Server. However, it will not be directly connected to the replication network.

At sites with more than one line server, one will be designated as the "Primary" line server. This server will receive all image imports, and these images will be transferred from the "Primary" server.

Disk Image Capture Program

The Disk Image Capture Program is responsible for saving the contents of a user specified hard drive into a SQL database. The image is used to populate hard drives in other systems with the same hardware configuration. The normal DSD download process is used to copy the image to an assembled unit hard drive.

The user of the Disk Image Capture System begins by inserting a CCP Access Control diskette into the capture unit. The diskette contains programs that will establish a network connection from the capture system to the CCP database and PRISM Line Server.

When a connection has been established, an application is executed from the server. The application will ask for several pieces of information. The CCP Associate will enter up to a sixty character description of the image, up to sixty characters for the customer name, and up to twenty characters for the customer identification.

A query of the CCP database is performed with the serial number of the capture system. If a system configuration record exists for the unit, a dialog is displayed asking if the image should be associated with this unit. If the system configuration record already has an image attached to it, an warning dialog is displayed with a message telling the user that the current image will be discarded if the new one is selected.

Each image is assigned a 6-3 identifier. This allocated from a group of identifiers assigned to the CCP site. The information previously entered is stored with the identifier.

This identifier is also used to describe the SKU Component created to store the directories and files for the image. This is stored in the "primary" PRISM line server. During download, the identifier is used as a software part number would be.

The application will begin execution by reading the partition information from the hard drive and storing it in control structures for the SKU Component. This will be used during restoration to partition a new hard drive.

The application reads the hard drive by searching for directories. The information for the directory is stored in the PRISM database. A search is then made in each directory for any files. The information for a file is stored in the PRISM database, and the file information is also linked to the directory where it was found. This process of reading files continues until all files have been read in a directory, then the next directory is read.

When all directories and the files in those directories have been stored in the PRISM database, the application terminates and displays a "Capture Complete" message on the capture system monitor.

Once the image is stored, it can be used on future builds for systems with the same hardware configuration. This image is available at software selection time.

Each image will need to perform a brief configuration step to register a new user name and company, as well as, a new Certificate of Authenticity. This information is configured by adding another SKU Component at the time the image is used on future builds.

Image Identifiers

The image identifiers are formatted the same as a part number. These identifiers are created to define an image in the PRISM database. The images are fully configured software components.

The 6-3 identifier is assigned from a pool of numbers allocated to the CCP site. The numbers are unique to the site and in the manufacturer's part number domain. The first character of the nine character number is a '~' character. The remaining eight characters are assigned from a value in the SITE table. After a new number is assigned, the value in the SITE table is incremented by one.

Download Program

The download process is initiated by the machine on which software will be installed. The download tool utilized in the preferred embodiment is referred to as GEMINI.

The download process is split into three separate functions: 1) obtain a SKU and create a BOM list; 2) Build a drive w/ the proper components and partitions based on the BOM list; and 3) Build ghost partitions in which software download verification and manufacturing diagnostic processes can be run.

PRBUILD: this process makes a 'packing' list of what files are needed for the given SKU as well as other global information about the drive such as file system type, boot file specs, etc. Once this list is made, PRBUILD spawns the next module: IMGBLDR.

IMGBLDR: this process takes as its input the packing list that was the output of PRBUILD and builds a drive with any combination of FAT16/FAT32 partitions. Once the drive is built, IMGBLDR spawns the next module: GHOST.

GHOST: this process takes as its input the packing list that was the output of PRBUILD as well as information about the end of data on the drive provided by IMGBLDR 1404 and builds ghost partitions on the drive.

GEMINI Module Execution

The GEMINI download process is capable of running in several different modes depending on the type of software download that is being performed. Channel Configuration Partner, or CCP mode provides a way for 3d party manufacturers to configure and install software at remote computer manufacturing sites. There are two ways to trigger CCP mode:

User Mode—This mode is intended for use by Channel Configuration sites, which is called by a control program written by the preinstall group.

Automatic Mode—is triggered by detecting a particular alphanumeric character in a particular place in the unit serial number.

When CCP mode is triggered, the program will call a stored procedure on the server, which then calls the SFDM database to get a list of software components and save them in #sfdm, a temporary table. After the list of software components is downloaded, a listing of the contents is used to create a copy of the CTO.TXT file on the RAM drive by querying #sfdm. This file is added to the list of files loaded on the drive image and is put into C:\SYSTEM.SAV. If the directory does not exist in the image, it will be created. If there is no user partition in the image, the file creation will never occur and the contents will be lost.

For each component listed in the CTO.TXT file, the server is told to add it into the working set by calling stored procedures for each component stored in #sfdm. This stored procedure updates the image state to contain all files in the component. When all components are added, the program calls a stored procedure to build the full list of files to download.

After the software components list, a second store procedure is called to get a list of hardware components. If valid data is returned by the stored procedure the text file CTOHW.TXT is created on the RAM drive. This file is copied from RAM drive to the diagnostics ghost partition when is created. This file is also added to the list of files loaded on the drive image and is put into C:\SYSTEM.SAV subdirectory of the primary user partition. If the \SYSTEM.SAV directory does not exist in the image, it will be created. If there is no user partition in the image, the file will only be copied to the diagnostics ghost partition.

The format of CTOHW.TXT does not contain any headers and it lists all the part numbers in one single line. Each part number (6-3) is followed by a comma and the quantity with no spaces in between. A carriage return is added at the end of the line. A sample of the contents of a CTOHW.TXT file:

123456-001,1,213456-001,1,323456-001,3,623456-001,2

PRBUILD 1402 then queries the #components table to get the size of the files in bytes, and the number of files.

After that, PRBUILD 1402 calls a stored procedure to get the partition information followed by a call to a second stored procedure to add the files CTO.TXT and CTOHW.TXT to #image. A CCP download process would resemble the following:

Entry Point for CCP mode

Initialize RPC and create temporary tables.

Call SFDM communication RPC procedure (sp_gemini_sfdm) and wait for results. If an error occurs, abort.

Build CTO.TXT file in the swap area and add file to component list.

Call RPC procedure sp_gemini_sfdm_convert and wait for results. If an error occurs, abort.

Call xp_Hardware_Components to build CTOHW.TXT file in swap area and add file to component list.

Call sp_gemini_image complete RPC procedure to finalize the image and wait for results. If an error occurs, abort.

Call sp_gemini_get_drive_info to build drive partitioning information

Build image list file in RAM by querying #image procedure and waiting for results. If an error occurs, abort.

Exit CCP specific code and pass control on to IMGBLDR.

The execution of PRBUILD proceeds as follows:

Connect to SQL Database 914 pointed to by SQL.DAT on the floppy or the SQL environment variable or the SQL value from A:\DSD.TXT.

Create SQL work tables for this connection.

Prompt for a serial number if a valid one does not exist in CMOS. The serial number may also be obtained form the User Input Area in certain situations.

Prompt for SKU number until a valid one is entered. If DSD mode, the SKU may also be obtained form the User Input Area in certain situations.

Call procedures to build the CTO.TXT software components list and the CTOHW.TXT hardware components list if valid data is returned.

Call a procedure to add the requested SKU onto the database representation of the image.

Call a procedure to build the drive in the database worktables.

Call a procedure to get global drive information which is saved in the state object.

Call a procedure to get partitioning data into the SPOOL.OUT file.

If in direct download mode and factory diagnostics are to be placed on the hard drive, WORLD.DAT is updated and Diags information is added to SPOOL.OUT so that GHOST is able to create a Diags partition and load the proper files.

Query #image to get the list of files to download and save them into the SPOOL.OUT file.

Logout from the database.

Transfer control to IMGBLDR.

The execution of IMGBLDR proceeds as follows:

Open SPOOL.OUT and Cworld object created by PRBUILD.

Create the skeleton of the drive image in memory.

For each partition, create that partition on the external drive and load it with files according to the SPOOL.OUT file.

If SCANDISK.FLG is set, run an MD5 and Scandisk on first download.

Run MD5 and Scandisk on second download.

Transfer control to GHOST.

The execution of GHOST proceeds as follows:

Open image list file created by PRBUILD.

If software download verification (SDV) is requested, save the current Master Boot Record (MBR)in the correct slot.

Create a ghost partition on the end of the drive, load the files found in the V:\NEWSDV network directory, and save all information in memory. Create the file CCP.TXT in the root of SDV ghost partition to signal SDV.

If running in surrogate download mode and there is enough space, save the ghost partition onto the Surrogate hard drive.

If diagnostics (DIAGS) are requested, save the current MBR in the correct slot, create a ghost partition on the end of the drive, load the files found in the directory (and all of its subdirectories) stored in the header information of the SPOOL.OUT into it, and commit the information. Copy the file CTOHW.TXT obtained by PRBUILD to the root directory of the diagnostics ghost partition. Create the file CCP.TXT in the root directory of the ghost partition to signal particular mode to diagnostics.

Return control to PRBUILD.

Security

Once data is entered into the master PRISM server 110, the DBMS replication process takes over to distribute this data to the various computer manufacturing and test facilities and their associated local databases and servers. All tables defined in the software distribution system specification are replicated to these servers.

The basic replication scheme makes use of the existing replication capabilities provided by Microsoft SQL Server 6.0 to the extent possible. Transaction-based replication is configured on all of the database tables, so that any changes to these tables are replicated to other servers around the world. The master PRISM database server provides the beginning point of all replication using these mechanisms.

Figure 9:
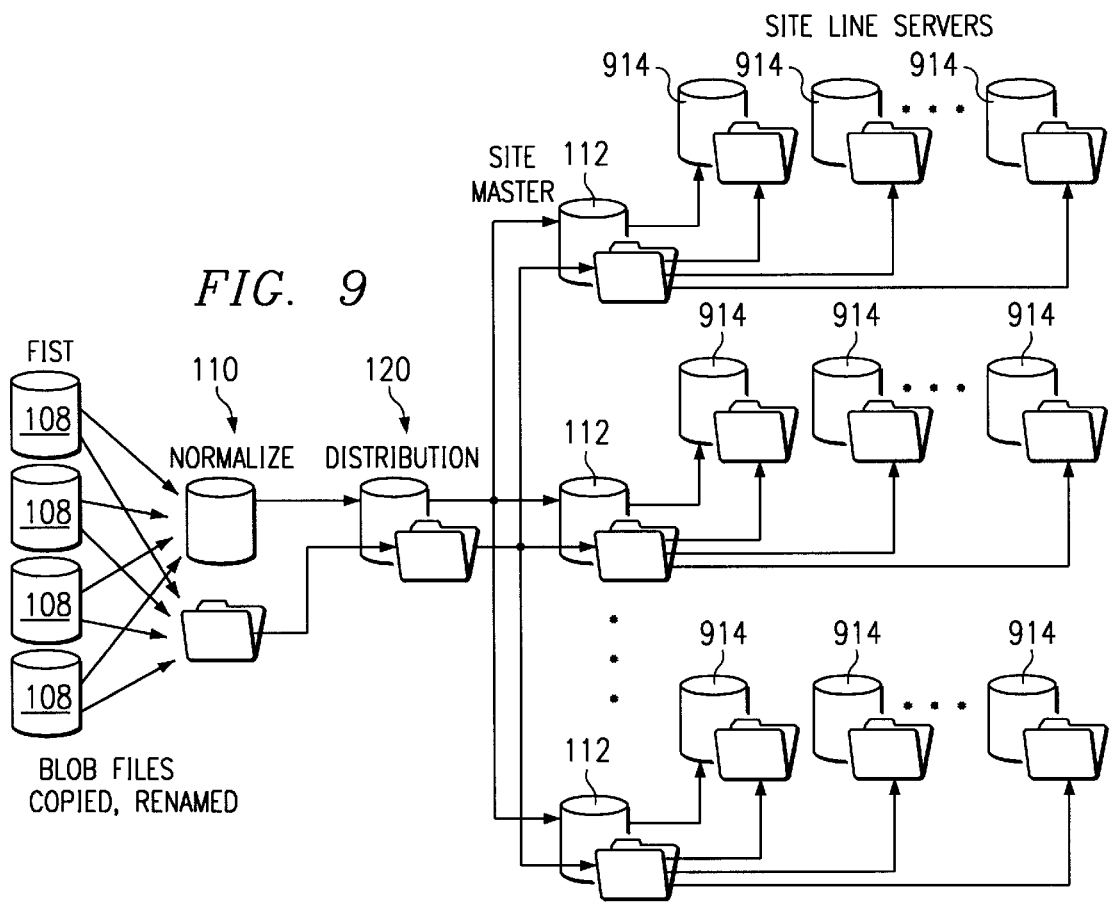
FIG. 9 shows a block diagram of the method by which data associated with released software in the master isolated database is replicated to remote manufacturing sites.

FIG. 9 illustrates the replication architecture with its associated dataflow. In FIG. 9, a machine 120 separate from the master site server is included in the replication set-up. This machine 120 is configured as an SQL Server "Distribution" server for the master PRISM server 110. This configuration allows most of the work of replication to be done by the Distribution server 120, rather than by the master PRISM server 110. Of course, replication to master site databases 112 can be accomplished without this intermediate "distribution" server 120.

Replication of most table data uses built-in transaction replication features of SQL Server. Replication is configured using a tree-like hierarchy. Transactions performed against the master PRISM server 110 are "published" (replicated) to the distribution server 120 (the subscriber to the publication, using SQL Server terminology). The distribution server 120 is configured as a "publisher" machine, and it replicates data to all the master site servers 112. These master site servers 112 are also configured as "publishers", and they replicate data to each of the local SQL servers 914 at their sites. These local SQL servers 914 are used directly by the computer manufacturing software installation process to build the target machines, completing the chain of replication.

Database transaction changes are straightforward to configure using built-in features of SQL Server 6.0. However, since SQL 6.0 does not replicate "image" data types (the actual BLOb files) on a transaction by transaction basis, an external mechanism is used to cause BLOBs to be distributed to all destination SQL Servers. Since SQL Server 6.0 replication depends on primary keys (and since documentation recommends this), all databases beyond the master PRISM database 110 and its associated distribution server 120 are configured with read-only (SELECT only) permissions for all tables. No INSERT, UPDATE, or DELETE operations are allowed to occur (except via Replication mechanisms) to any replicated table in the system beyond the master PRISM database 110.

MD5 Calculation

The replication of the database and datafiles which takes place in the process depicted by FIG. 9 relies on the DBMS, for database replication, and MD5 check values, for datafile replication. Relational database management systems, such as PRISM and CCP are able to replicate entire databases across networks, even while they are active. DBMS replication techniques usually make use of the transaction log of the master database. By replicating the transactions that have taken place on the master, the replicated databases can be kept in-sync without requiring that all the data of the master be transmitted. DBMS replication maintains its own integrity to ensure that all of the databases are updated properly. The replication of datafiles, described in detail in P-1721, does not have the advantage of the checks afforded by DBMS replication techniques. Replication of datafiles relies on an MD5 value. The total accumulation of all the individually calculated BLOb MD5 values of the BOM, CRC-32 values for Directory and Partition as well as number of files and size of the entire BOM contents are included in BomMD5, DirCRC, PCRC, NumFilesInBom and Size respectively. MD5 is a message digest protocol used to generate public keys for messages in the RSA/digital encryption schemes. The MD5 value derived from using the MD5 protocol against an individual file has a high probability of being unique and can therefore be used, in conjunction with the file's size, as a unique identifier for the file.

BomMD5 is calculated by taking each file's calculated 128 bit (or 16 byte) MD5 value and adding each of the individual bytes into a counterpart byte (without carry to the next byte) in a 128 bit accumulator (which was initialized to zero in the beginning). In other words, byte 0 of the current file's MD5 value is added to byte 0 of the accumulator, byte 1 of the file to byte 1 of the accumulator and so on. Because of the lack of carry between bytes, the addition is obviously not 128-bit precision. This does not, however, diminish the value of this field as an overall 'checksum' accumulation of all the MD5 values for the database. All of these values are used as check values on the integrity of a given SKU/BOM and its contents. MBRDataKey points to the master boot record (in the BLObject table 214) for the BOM. The partition information in the master boot record must be nulled out before insertion into FIST, to guarantee correct normalization and for proper use with the download tools.

The zero-based offset within the partition table is at 0×1BE and is 96 decimal bytes in length. Since the boot sectors are not considered files, they are therefore not included in NumFilesInBom nor are their MD5 calculations included in BomMD5.

DirCRC and PCRC are accumulations of individual CRCs generated by passing the individual fields of the DirEntry and Partition records for a BOM to some pre-defined functions which incorporate them into structures in memory, making sure that unused parts are NULLed out, and then calculating the CRC-32 of that buffer and passing that back to the caller. It is then the caller's responsibility to keep an ongoing accumulation of the DirCRC and PCRC values by adding the individual values returned from the pre-defined functions together using normal addition on the unsigned long.

These values should be set when inserting a BOM into the database. They can be used for verification at any given server to make sure the information is the same as that originally put into the database.

An MD5 value is kept in the database for each datafile managed by the PRISM DBMS. Whenever a datafile is replicated from the master server to the remote manufacturing facility, its MD5 value, calculated at the new server location, is verified against its MD5 value stored in the database. If the values differ, the datafile is not released for use and is transferred and verified again. This MD5 check prevents datafiles which have been corrupted during transfer or altered from being pre-installed on newly assembled computers.

Access to database information is controlled by the DBMS based on privileges. The privileges are granted or denied to users of the database by the Database Administrator. At the remote manufacturing facility, access to data is strictly limited.

The CCP and PRISM databases contain supporting data for helping in the build process and the information for each system built.

The tables used in the PRISM database contain and manage the software configurations which will be downloaded onto an assembled unit. The tables are fully described in application Ser. No. 09/002,152, filed Dec. 31, 1997 (Atty's No. P-1721). Following is a short description of each table in the PRISM database.

SKU Table

The SKU table is the means by which effectivity and expiration dates are associated with a SKU as well as storage for the actual SKU number. It also provides a means to mark a SKU as disabled for download, and therefore not yet ready to be used by the factory. The SKU is part of the core information because the SKU/BOM relationship is considered essential from the standpoint of corporate information systems.

SkuToBom Table

This table will require entries to be made when a SKU is associated with a BOM. Allows one or more SKU IDs to be associated with a BOM number. It also allows more than one BOM to be associated with one SKU id.

Bom Table

Master information for each BOM number including when it was created and last updated.

BomFile Table

Establishes the relationship between BOM id and the files associated with the BOM as well as what partitions they should be installed in.

Partition Table

This contains hard drive partition information for all the possible machine configurations represented in the tables.

DirEntry Table

Part of the main core of mandatory columns/tables, this is the actual directory information for each file archived in the database.

BLObject Table

The association of Partition, DirEntry and BLObject are necessary to recreate a file on a target system.

Division Table

The Division Table is a master lookup read-only table for identification of product systems-engineering divisions.

BomApps Table

Establishes a relationship between a BOM and an application.

Apps Table

Contains all the apps that must be declared for the group of BOMs represented in the tables.

Distribution Table

Allows optional association of a BOM to a particular factory database server destination for use during replication in deciding where and when to distribute BOMs.

Destinations Table

The Destinations Table is a master lookup table for all possible factory database server destinations.

The following tables in the CCP database provide information on the hardware and software configuration of an assembled unit. The tables define the particular software configurations to be downloaded from the PRISM database. Once the download is complete, the tables are used to preserve the hardware and software configuration for both the manufacturer's and third-party hardware and software as an "as-built" record.

AUDIT-LOG

Records all actions against the CCP database. Where; when; and who did the action.

COMPAQ-LANGUAGE

All Compaq language codes.

COMPAQ-OS

All unique operating system identifiers supported by Compaq.

CONFIGURATION

Describes a Compaq system built at the CCP site.

CONFIGURATION-CODE

Contains family (configuration) codes for each base model part number.

CONFIGURATION-PART

Part numbers of Compaq added software and hardware.

CONFIGURATION-RULE

Rules are a method of establishing dependencies between hardware and software part number tags or between two software part number tags.

CONFIGURATION-SERIAL

Records serial number for Compaq components added to a system configuration.

DATA-COLLECTION

Stores the status of diagnostics software download and post processing. PASS/FAIL is recorded.

DIVISION

Identifies all Compaq divisions building systems in the Channel Configuration Program.

DIVISION-SITE-OPTION

Site-specific default information. Language and operating system defaults for a site are stored here.

IMAGE

A fully configured image for a Configuration. Describes all partition and file information for a system.

LOCALIZED-LANGUAGE

Localized language names.

LOCALIZED-TAG

The localized string for a TAG description used for display.

LOCALIZED-TAG-TYPE

Stores the translated description of TAG types for display purposes.

MODEL

Slots and bays for a Model-1 Base Configuration.

NON-COMPAQ-PART

Describes the non-Compaq software and hardware added to a Compaq system at the CCP site.

PART

Defines all valid Compaq hardware and software part numbers.

PRODUCT-BOM

Contains all TAGs for a specific product model.

REGION

Contains REGION descriptions used during regional settings selection.

ROM-PART

Description of FLASH ROM parts. Identified by Model-1 base configuration.

SELECTED-TAG

Contains all selected TAGs for a system configuration. This includes the hardware and software TAGs.

SITE

Master list of all CCP sites. Default configuration information about the site.

TAG

Part Number Tag definition. Used as an abstraction of a real part number.

TAG-TYPE

Display and entry parameters for a TAG.

USER_DIVISION

Used to validate access to the CCP Corp Master server from the divisions. A stored procedure validates requesting user against users in this table.

Security and Access Privileges

Several SQL Server login and user names are defined within the system in order to provide various levels of database access security within the SWDNLOAD domain. Such security levels are maintained by the DBMS. System Administrator and Database Operator logins usually have permission to administer anything within the SQL Server. This includes all select, insert, update, and delete operations. It also includes creating logins, establishing permissions, back-up, recovery, and other database maintenance and oversight routines.

However, at remote manufacturing facilities, permissions are limited by the DBMS. Generally, the download process requires only a need to select (or read) the data contained in the database. Update and delete operations are not necessary as the data, once it reaches the remote manufacturing facility, is in the proper form for download and need not be altered. Therefore, database logins at the remote manufacturing facility have the following privileges:

| Table/View | SELECT | INSERT | UPDATE | DELETE |
|---|---|---|---|---|
| Apps | X | | | |
| BLObject | X | | | |
| Bom | X | | | |
| BomApps | X | | | |
| BomFile | X | | | |
| DirEntry | X | | | |
| Division | X | | | |
| Log | X | | X | |
| Partition | X | | | |
| SKU | X | | | |
| SkuToBom | X | | | |
| DASH (View) | X | | | |

The CCP database permissions granted to the logins at the remote manufacturing facility are similar to those of the PRISM database. However, since data is both read and written from the CCP database, several different classes of login exist.

This group has the users: CCPDL and DASH and is used by the Software Download Diskette.

| User | Table/View/Stored Procedure | Column | Select | Insert | Update | Delete | Execution |
|---|---|---|---|---|---|---|---|
| dash | CONFIGURATION | ALL | X | | | | |
| dash | CONFIGURATION_PART | ALL | X | | | | |
| dash | ImageIdToInt | | | | | | X |
| dash | PART | ALL | X | | | | |
| Diskette Control | sp_ClearDateConfigured | | | | | | X |
| Diskette Control | sp_Get_Download_Status | | | | | | X |
| Diskette Control | sp_Insert_Data_Collection | | | | | | X |
| Diskette Control | sp_Set_Download_Status | | | | | | X |
| Diskette Control | sp_Set_ROM_Description | | | | | | X |
| Diskette Control | sp_Set_ShipDate | | | | | | X |

This group has users that are designated at the specific CCP site to perform supervisor duties.

| User | Table\View\Stored Procedure | Column | Select | Insert | Update | Delete | Execution |
|---|---|---|---|---|---|---|---|
| CCPClientSupervisor | ACTIVE_BOM | All | X | | | | |
| CCPClientSupervisor | AUDIT_LOG | All | | X | | | |
| CCPClientSupervisor | CFG_PART_SERIAL_VIEW | All | X | | | | |
| CCPClientSupervisor | CFGCODE_MODEL_PART_VIEW | All | X | | | | |
| CCPClientSupervisor | CONFIGURATION | All | X | | | | |
| CCPClientSupervisor | CONFIGURATION_CODE | All | X | | | | |
| CCPClientSupervisor | CONFIGURATION_PART | All | X | | | | |
| CCPClientSupervisor | CONFIGURATION_SERIAL | All | X | | | | |
| CCPClientSupervisor | HARDWARE_VIEW | All | X | | | | |
| CCPClientSupervisor | IMAGE | All | X | | X | | |
| CCPClientSupervisor | LOCALIZED_LANGUAGE | All | X | | | | |
| CCPClientSupervisor | LOCALIZED_TAG | All | X | | | | |
| CCPClientSupervisor | LOCALIZED_TAG_TYPE | All | X | | | | |
| CCPClientSupervisor | MODEL | All | X | | | | |
| CCPClientSupervisor | NON_COMPAQ_PART | All | X | | | | |
| CCPClientSupervisor | PART | All | X | | | | |
| CCPClientSupervisor | PRODUCT_BOM | All | X | | | | |
| CCPClientSupervisor | REGION | All | X | | | | |
| CCPClientSupervisor | SELECTED_TAG | All | X | | | | |
| CCPClientSupervisor | SOFTWARE_VIEW | All | X | | | | |
| CCPClientSupervisor | sp_Set_Download_Status | All | | | | | X |
| CCPClientSupervisor | sp_Set_Download_Status_Supv | All | | | | | X |
| CCPClientSupervisor | TAG | All | X | | | | |
| CCPClientSupervisor | TAG_TYPE | All | X | | | | |

This group has the user: CCPTech and is used by CCP associates.

| User | Table\View\Stored Procedure | Column | Select | Insert | Update | Delete | Execution |
|---|---|---|---|---|---|---|---|
| CCPClientTechnician | ACTIVE_BOM | All | X | | | | |
| CCPClientTechnician | CFG_PART_SERIAL_VIEW | All | X | | | | |
| CCPClientTechnician | CFGCODE_MODEL_PART_VIEW | All | X | | | | |
| CCPClientTechnician | CONFIGURATION | All | X | | | | |
| CCPClientTechnician | CONFIGURATION_CODE | All | X | | | | |
| CCPClientTechnician | CONFIGURATION_PART | All | X | | | | |
| CCPClientTechnician | CONFIGURATION_SERIAL | All | X | | | | |
| CCPClientTechnician | HARDWARE_VIEW | All | X | | | | |
| CCPClientTechnician | IMAGE | All | X | | | | |
| CCPClientTechnician | LOCALIZED_LANGUAGE | All | X | | | | |
| CCPClientTechnician | LOCALIZED_TAG | All | X | | | | |
| CCPClientTechnician | LOCALIZED_TAG_TYPE | All | X | | | | |
| CCPClientTechnician | MODEL | All | X | | | | |
| CCPClientTechnician | NON_COMPAQ_PART | All | X | | | | |
| CCPClientTechnician | PART | All | X | | | | |
| CCPClientTechnician | PRODUCT_BOM | All | X | | | | |
| CCPClientTechnician | REGION | All | X | | | | |
| CCPClientTechnician | SELECTED_TAG | All | X | | | | |
| CCPClientTechnician | SOFTWARE_VIEW | All | X | | | | |
| CCPClientTechnician | sp_Set_Download_Status | | | | | | X |
| CCPClientTechnician | TAG | All | X | | | | |
| CCPClientTechnician | TAG_TYPE | All | X | | | | |

This group has the user: imageimport and is used by associates creating images to be saved by the CCP database.

| User | Table\View\Stored Procedure | Column | Select | Insert | Update | Delete | Execution |
|---|---|---|---|---|---|---|---|
| imageimport | sp_Validate_Image | | | | | | X |
| ImageImportUsers | CONFIGURATION | All | X | | | | |
| ImageImportUsers | IMAGE | | | | | X | |
| ImageImportUsers | IMAGE | | | X | | | |
| ImageImportUsers | IMAGE | All | X | | | | |

-continued

| User | Table\View\Stored Procedure | Column | Select | Insert | Update | Delete | Execution |
|---|---|---|---|---|---|---|---|
| ImageImportUsers | IMAGE | All | | | X | | |
| ImageImportUsers | ImageIdToInt | | | | | | X |
| ImageImportUsers | sp_Set_Image_Table | | | | | | X |
| ImageImportUsers | sp_Validate_Image_Table | | | | | | X |

This group has the user: CCPImport and is used by CCP associates wishing to use disk images.

| User | Table/Stored Procedure | Column | Select | Insert | Update | Delete | Execution |
|---|---|---|---|---|---|---|---|
| ImportUsers | ACTIVE_BOM | ALL | X | | | | |
| ImportUsers | ACTIVE_MODEL | ALL | X | | | | |
| ImportUsers | ACTIVE_RULE | ALL | X | | | | |
| ImportUsers | ACTIVE_TAG | ALL | X | | | | |
| ImportUsers | COMMODITY | ALL | X | | | | |
| ImportUsers | COMPAQ_LANGUAGE | ALL | X | | | | |
| ImportUsers | COMPAQ_OS | ALL | X | | | | |
| ImportUsers | CONFIGURATION | ALL | X | | | | |
| ImportUsers | CONFIGURATION_CODE | ALL | X | | | | |
| ImportUsers | CONFIGURATION_PART | ALL | X | | | | |
| ImportUsers | CONFIGURATION_RULE | ALL | X | | | | |
| ImportUsers | CONFIGURATION_SERIAL | ALL | X | | | | |
| ImportUsers | DATA_COLLECTION | ALL | X | | | | |
| ImportUsers | DIVISION | ALL | X | | | | |
| ImportUsers | IMAGE | ALL | X | | | | |
| ImportUsers | LANGUAGE_OS | ALL | X | | | | |
| ImportUsers | LOCALIZED_LANGUAGE | ALL | X | | | | |
| ImportUsers | LOCALIZED_TAG | ALL | X | | | | |
| ImportUsers | LOCALIZED_TAG_TYPE | ALL | X | | | | |
| ImportUsers | MODEL | ALL | X | | | | |
| ImportUsers | NON_COMPAQ_PART | ALL | X | | | | |
| ImportUsers | PART | ALL | X | | | | |
| ImportUsers | PRODUCT_BOM | ALL | X | | | | |
| ImportUsers | REGION | ALL | X | | | | |
| ImportUsers | SELECTED_TAG | ALL | X | | | | |
| ImportUsers | sp_Add_Compaq_Hardware_Part | | | | | | X |
| ImportUsers | sp_Add_Compaq_Software_Part | | | | | | X |
| ImportUsers | sp_Check_For_COA | | | | | | X |
| ImportUsers | sp_Check_If_COA_In_Use | | | | | | X |
| ImportUsers | sp_Clean_CCP_Configuration | | | | | | X |
| ImportUsers | sp_Clean_Configuration_Part | | | | | | X |
| ImportUsers | sp_Clean_Configuration_Serial | | | | | | X |
| ImportUsers | sp_Clean_Non_Compaq_Part | | | | | | X |
| ImportUsers | sp_Clean_Non_Compaq_Parts | | | | | | X |
| ImportUsers | sp_Clean_Selected_Tags | | | | | | X |
| ImportUsers | sp_Get_Download_Status | | | | | | X |
| ImportUsers | sp_Insert_Configuration | | | | | | X |
| ImportUsers | sp_Insert_Configuration_Part | | | | | | X |
| ImportUsers | sp_Insert_Configuration_Serial | | | | | | X |
| ImportUsers | sp_Insert_Data_Collection | | | | | | X |
| ImportUsers | sp_Insert_Non_Compaq_Part | | | | | | X |
| ImportUsers | sp_Insert_Selected_Tag | | | | | | X |
| ImportUsers | sp_Is_Supv | | | | | | X |
| ImportUsers | sp_Lock_Configuration | | | | | | X |
| ImportUsers | sp_Log_Audit_Action | | | | | | X |
| ImportUsers | sp_Set_Date_Shipped | | | | | | X |
| ImportUsers | sp_Set_DOA | | | | | | X |
| ImportUsers | sp_Set_Download_Status | | | | | | X |
| ImportUsers | sp_Set_Download_Status_Supv | | | | | | X |
| ImportUsers | sp_Set_Receive | | | | | | X |
| ImportUsers | sp_Set_Repair | | | | | | X |
| ImportUsers | sp_Set_ROM_Description | | | | | | X |
| ImportUsers | sp_Unlock_Configuration | | | | | | X |
| ImportUsers | sp_Update_Config_Part_Qty | | | | | | X |
| ImportUsers | sp_Update_Configuration | | | | | | X |
| ImportUsers | sp_Update_Configuration_Part | | | | | | X |
| ImportUsers | sp_Update_Selected_Tag_Qty | | | | | | X |
| ImportUsers | sp_Validate_Image | | | | | | X |
| ImportUsers | sp_Verifies_Download_Status | | | | | | X |

-continued

| User | Table/Stored Procedure | Column | Select | Insert | Update | Delete | Execution |
|---|---|---|---|---|---|---|---|
| ImportUsers | TAG | ALL | X | | | | |
| ImportUsers | TAG TYPE | ALL | X | | | | |

This group has the user: CCPExprt and is used to export data to the manufacturing headquarters.

| User | Table\View\Stored Procedure | Column | Select | Insert | Update | Delete | Execution |
|---|---|---|---|---|---|---|---|
| CCPExprt | sp_CheckConfig | | | | | | |
| ExportUsers | AUDIT_LOG_VIEW | ALL | X | | | | |
| ExportUsers | BASE_MODEL | ALL | X | | | | |
| ExportUsers | COA | ALL | X | | | | |
| ExportUsers | COMPAQ_HARDWARE | ALL | X | | | | |
| ExportUsers | COMPAQ_SOFTWARE | ALL | X | | | | |
| ExportUsers | CONFIGURATION | ALL | X | | | | |
| ExportUsers | CONFIGURATION | CFG_SENT | | | X | | |
| ExportUsers | DATA_COLLECTION_VIEW | ALL | X | | | | |
| ExportUsers | IMAGE | IMAGE_IDENTIFIER | X | | | | |
| ExportUsers | IMAGE | IMAGE_CREATOR_SERIAL_NUMBER | | | | | |
| ExportUsers | IMAGE_VIEW | ALL | X | | | | |
| ExportUsers | LANGUAGE | ALL | X | | | | |
| ExportUsers | NON_COMPAQ_HARDWARE | ALL | X | | | | |
| ExportUsers | NON_COMPAQ_SOFTWARE | ALL | X | | | | |
| ExportUsers | OS | ALL | X | | | | |
| ExportUsers | REGION_VIEW | ALL | X | | | | |
| ExportUsers | ROM_VIEW | ALL | X | | | | |
| ExportUsers | SN | ALL | X | | | | |

Database Management Systems

Many different database management structures are currently used in business and manufacturing process. Hierarchical, network, and object-oriented are a few of the structures that are common. Presently, the most common database structure is the relational database model. Its structure allows the data to be presented as a series of relations, that is, how each piece of data in the database relates, if at all, to every other piece of data.

This relationship presents itself most effectively when organized into tables. Keys are used to access the data in the table. Each table consists of data that is closely related. Each table has at least one key, the primary key, but can have other secondary keys. A database structure will consist of one or more tables, each table with one or more keys.

The structure is defined by the relationship of the data in one table to the data in another table. The relationships between tables can be none, one to one, many to many, etc.

Database Security

Database security, in a relational database, is maintained through the control of access to the database tables by the DBMS. Privilege descriptors are maintained by DBMSs to enforce database security. Data that is considered privileged can be protected from access by those persons or programs that should not see it. Other data can be protected from alteration by granting read-only privilege to specified users. Generally, select, insert, update, delete and reference privileges are controlled by the DBMS at the table level. Usage of a particular database can also be controlled by the DBMS. These privileges are assigned to users of the database based on their need to reference and manipulate information. Without the proper privileges, data in the database cannot be accessed or modified.

DBMSs for relational databases allow for the performance of actions outside the database context to take place when some specified database action is performed (a "trigger"). For instance, if a notification letter needs to be sent out whenever an address is changed, a DBMS trigger can be written which will be automatically executed by the DBMS whenever it performs an update to the address table. While convenient, this can also increase the overhead consumed by a DBMS.

Additionally, DBMSs have replication (or mirror) techniques which allow them to reproduce their entire database (structure and contents) to another location. Utilizing the DBMS replication techniques takes increased overhead, but can be a convenient way to keep databases at remote facilities current and "in-synch" (that is, the databases contain the same data).

Firewalls

FIG. 1A depicts a firewall between the network connections of the manufacturing headquarters and those of the remote manufacturing facilities. Firewalls are a means of controlling network traffic. They are usually a combination of computer hardware and software that is interposed between a network site and the rest of the network. Firewalls create a level of security by allowing authorized access of data based on privileges or other security policies while attempting to preventing unauthorized access. In this particular network, access to both PRISM and CCP servers on the manufacturing headquarters side of the firewall can be prevented as there is no need for access to these databases by the remote manufacturing facility or any other entity. Access to the EDI server can be limited to those message sent by the CCP server at remote manufacturing sites.

As-Built Database

Figure 2:
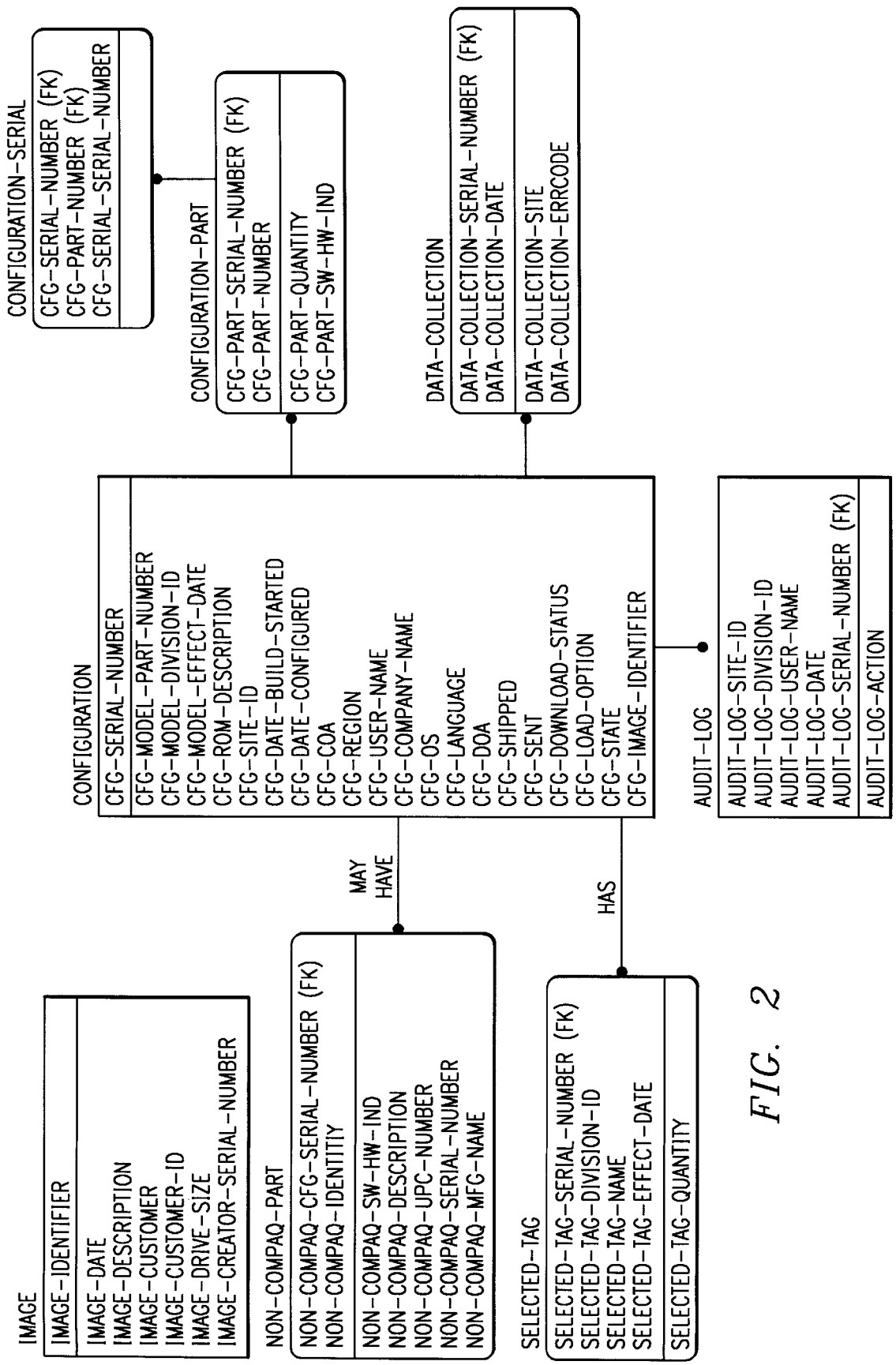
FIG. 2 shows an Entity-Relationship Diagram which describes the relational database structure used for storing "as-built" configurations in the novel computer manufacturing software download installation system.

FIG. 2 depicts an ERD of the CCP database tables used to manage the hardware and software configurations of an assembled unit to be pre-installed with software. This same set of tables provides "as-built" information to manufacturing headquarters.

Each Entity and its attributes are described in the tables in this section.

| ENTITY NAME | ATTRIBUTE NAMES |
|---|---|
| AUDIT-LOG | AUDIT-LOG-SITE-ID (PK) |
| | AUDIT-LOG-DIVISION-ID (PK) |
| | AUDIT-LOG-USER-NAME (PK) |
| | AUDIT-LOG-DATE (PK) |
| | AUDIT-LOG-SERIAL-NUMBER (PK) (FK) |
| | AUDIT-LOG-ACTION |
| CONFIGURATION | CFG-SERIAL-NUMBER (PK) |
| | CFG-MODEL-PART-NUMBER |
| | CFG-MODEL-DIVISION-ID |
| | CFG-MODEL-EFFECT-DATE |
| | CFG-ROM-DESCRIPTION |
| | CFG-SITE-ID |
| | CFG-DATE-BUILD-STARTED |
| | CFG-DATE-CONFIGURED |
| | CFG-COA |
| | CFG-REGION |
| | CFG-USER-NAME |
| | CFG-COMPANY-NAME |
| | CFG-OS |
| | CFG-LANGUAGE |
| | CFG-DOA |
| | CFG-SHIPPED |
| | CFG-SENT |
| | CFG-DOWNLOAD-STATUS |
| | CFG-LOAD-OPTION |
| | CFG-STATE |
| | CFG-IMAGE-IDENTIFIER |
| CONFIGURATION-PART | CFG-PART-SERIAL-NUMBER (PK) (FK) |
| | CFG-PART-NUMBER (PK) |
| | CFG-PART-QUANTITY |
| | CFG-PART-SW-HW-IND |
| CONFIGURATION-SERIAL | CFG-SERIAL-NUMBER (PK) (FK) |
| | CFG-PART-NUMBER (PK) (FK) |
| | CFG-SERIAL-SERIAL-NUMBER (PK) |
| DATA-COLLECTION | DATA-COLLECTION-SERIAL-NUMBER |
| | DATA-COLLECTION-DATE (PK) |
| | DATA-COLLECTION-SITE |
| | DATA-COLLECTION-ERRCODE |
| IMAGE | IMAGE-IDENTIFIER (PK) |
| | IMAGE-DATE |
| | IMAGE-DESCRIPTION |
| | IMAGE-CUSTOMER |
| | IMAGE-CUSTOMER-ID |
| | IMAGE-DRIVE-SIZE |
| | IMAGE-CREATOR-SERIAL-NUMBER |
| NON-COMPAQ-PART | NON-COMPAQ-CFG-SERIAL-NUMBER |
| | NON-COMPAQ-IDENTITY (PK) |
| | NON-COMPAQ-SW-HW-IND |
| | NON-COMPAQ-DESCRIPTION |
| | NON-COMPAQ-UPC-NUMBER |
| | NON-COMPAQ-SERIAL-NUMBER |
| | NON-COMPAQ-MFG-NAME |
| SELECTED-TAG | SELECTED-TAG-SERIAL-NUMBER (PK) (FK) |
| | SELECTED-TAG-DIVISION-ID (PK) |
| | SELECTED-TAG-NAME (PK) |
| | SELECTED-TAG-EFFECT-DATE (PK) |
| | SELECTED-TAG-QUANTITY |

Attribute Definition

Each attribute, along with its usage as a Primary or Foreign key, its definition, and the entity that uses it.

| Attribute Name | Attribute Definition |
|---|---|
| AUDIT-LOG-ACTION | The type of operation executed by the CCP Associate |
| AUDIT-LOG-DATE | The date that the action occurred. |
| AUDIT-LOG-DIVISION-ID | |
| AUDIT-LOG-SERIAL-NUMBER | The serial number of the baseunit. |
| AUDIT-LOG-SITE-ID | |
| AUDIT-LOG-USER-NAME | The logon name for the user. |
| CFG-COA | The Certificate of Authenticity number for the operating system selected. |
| CFG-COMPANY-NAME | The company name entered for this configuration. |
| CFG-DATE-BUILD-STARTED | The date that the build began for this configuration. |
| CFG-DATE-CONFIGURED | The date that the part numbers were requested by PRISM for a download. |
| CFG-DOA | TRUE = Unit is dead-on-arrival. |
| CFG-DOWNLOAD-STATUS | Status for software download for the configuration. |
| CFG-IMAGE-IDENTIFIER | Identifies the image part number used. |
| CFG-LANGUAGE | Language version for the installed software. |
| CFG-LOAD-OPTION | The type of software load performed for the unit: None Components or Image. |
| CFG-MODEL-DIVISION-ID | Division id for base model. |
| CFG-MODEL-EFFECT-DATE | Date that the base model definition becomes effective. |
| CFG-MODEL-PART-NUMBER | Part number base model. |
| CFG-OS | Operating system selection used in this configuration. |
| CFG-PART-NUMBER | |
| CFG-PART-NUMBER | Part number of the Compaq option. |
| CFG-PART-QUANTITY | The number of parts used by the configuration. |
| CFG-PART-SERIAL-NUMBER | Serial number of configuration whose part numbers are defined here. |
| CFG-PART-SW-HW-IND | Hardware or Software part. CONFIGURATION-PART |
| CFG-REGION | The country or region selected during software selection. |
| CFG-ROM-DESCRIPTION | ROM description. |
| CFG-SENT | The configuration information has been sent. |
| CFG-SERIAL-NUMBER | |
| CFG-SERIAL-NUMBER | Serial number for the unit. |
| CFG-SERIAL-SERIAL-NUMBER | |
| CFG-SHIPPED | All configuration for a unit has been completed. |
| CFG-SITE-ID | A unique identifier assigned to a CCP Site. This value is retrieved from the system registry. |
| CFG-STATE | |
| CFG-USER-NAME | The user name entered for this configuration. |
| DATA-COLLECTION-DATE | The date and time when the error was logged. |
| DATA-COLLECTION-ERRCODE | The type of error that occurred. |
| DATA-COLLECTION-SERIAL-NUMBER | Serial number of the unit where download oc- |

-continued

| Attribute Name | Attribute Definition |
|---|---|
| | curred. |
| DATA-COLLECTION-SITE | A unique identifier assigned to a CCP Site. This value is retrieved from the system registry. |
| IMAGE-CREATOR-SERIAL-NUMBER | |
| IMAGE-CUSTOMER | Name of the customer that the image belongs to. |
| IMAGE-CUSTOMER-ID | A twenty character user defined identifier for the customer. |
| IMAGE-DATE | The date that the image was created. |
| IMAGE-DESCRIPTION | The CCP Associates description assigned to the image. This is used during software selection. |
| IMAGE-DRIVE-SIZE | The size in MB of the drive the image was on. |
| IMAGE-IDENTIFIER | |
| NON-COMPAQ-CFG-SERIAL-NUMBER | |
| NON-COMPAQ-DESCRIPTION | Free form description for the non-Compaq part. |
| NON-COMPAQ-IDENTITY | |
| NON-COMPAQ-MFG-NAME | Name of manufacturer for the part. |
| NON-COMPAQ-SERIAL-NUMBER | Serial number of the non-Compaq part. |
| NON-COMPAQ-SW-HW-IND | Categorizes the non-Compaq part as hardware or software. |
| NON-COMPAQ-UPC-NUMBER | Universal product code for the non-Compaq part. |
| SELECTED-TAG-DIVISION-ID | Division identifier that owns the TAG. |
| SELECTED-TAG-EFFECT-DATE | The date that this TAG became effective. |
| SELECTED-TAG-NAME | An identifier that is used instead of an actual hardware or software part number. The TAG is meant to reduce maintenance in the system when an actual part number changes. |
| SELECTED-TAG-QUANTITY | The number of the same TAGs selected. For example multiple memory modules with the same part number. |
| SELECTED-TAG-SERIAL-NUMBER | Configuration where TAG is used. |

After the download of software has taken place and the assembled unit has been marked as ready to ship, the "as-built" information is formatted for transfer to the manufacturer. All configuration information is stored in a fixed field file, where each record is identified with a text string designating the type of information for the record. The data is read from the site copy of the CCP database, formatted into a text file, and sent to the manufacturer.

File Naming Convention

Each file sent will be named according to the following format: YYYYMMDD.####

Where:

| YYYY | the year that the configuration file was built |
| MM | the month that the file was built |
| DD | the day of the day the file was built |

-continued

| #### | a sequential number expressed as a hexadecimal number. |
|---|---|

Record formats

This section defines each of the valid record formats. Each record written to the export configuration file is terminated with a carriage return and line feed character.

All content fields where the text is bracketed by double quotes are literal strings. These strings are written as they are shown. For example, if the string "ABC" were shown in a content column, then ABC would be written to the output file.

Any columns not explicitly defined with a value will contain spaces.

Record Identifiers

The following segment types for the IDOC 856 EDI message type are supported by the File Export program.

| Record type | Description |
|---|---|
| EDI DOC | Header |
| E2EDKA2 | Site identifier |
| E2EDK06 | File creation date |
| E2EDPT1 | Hardware/software type record |
| E2EDPT2 | Hardware/software detail record |
| E2EDS02 | Termination record |

The first three records of the file are used to indicate the origins of the file to the manufacturer's processes receiving the file.

EDI DOC Header record

One of these records is written for each file. It is the first record written.

| Position | Size | Contents | Description |
|---|---|---|---|
| 1 | 10 | "EDI_DOC" | Name of table structure |
| 11 | 3 | "800" | Client |
| 14 | 16 | Generated number | Sequential document number assigned by generating system. |
| 30 | 4 | "31G" | SAP Release of IDoc |
| 34 | 2 | "30" | Status of IDoc |
| 36 | 8 | "DESADV01" | IDoc type |
| 44 | 1 | "1" | 1 = outbound 2 = inbound |
| 45 | 10 | "CCPGOLD" | Receiver port (SAP System, EDI |
| 55 | 2 | "KU" | KU = customer LI = Vendor |
| 57 | 10 | CFG_SITE_ID | Customer Number for CCP |
| 67 | 21 | | N/A |
| 88 | 70 | | N/A for EDI |
| 158 | 1 | "X" | X = ANSI E = EDIFACT |
| 159 | 6 | "003020" | Version of EDI standard |
| 165 | 6 | "856" | EDI message type |
| 171 | 3 | "CRS" | Used internally by SAP for translation mapping |
| 174 | 3 | "CCP" | Used internally by SAP for translation mapping |
| 177 | 1 | "2" | 2 = Flat File |
| 178 | 1 | "X" | X = Test Blank = Production |

-continued

| Position | Size | Contents | Description |
|---|---|---|---|
| 179 | 10 | "CCPDBV" | Sender port (SAP System, EDI s |
| 189 | 2 | "LI" | LI = Supplier |
| 191 | 10 | "0000000280" | Partner number of sender |
| 201 | 21 | | Not Used |
| 222 | 70 | | Not Used |
| 292 | 14 | | Not Used |
| 306 | 14 | | Not Used |
| 320 | 14 | | Not Used |
| 334 | 70 | | Not Used |
| 404 | 8 | YYYYMMDD | Date IDoc was created |
| 412 | 6 | HHMMSS | Time IDoc was created |
| 418 | 6 | "DESADV" | Logical message type |
| 424 | 8 | "DESADVO1" | Name of basic IDoc type |
| 432 | 8 | | N/A |
| 440 | 2 | | N/A |
| 442 | 2 | | N/A |
| 444 | 20 | YYYYMMDDHHMMSS | Date Time stamp |
| 464 | 1 | | N/A |

E2EDKA2 Site Id

| Position | Size | Contents | Description |
|---|---|---|---|
| 1 | 10 | "E2EDKA2001" | |
| 56 | 3 | "AG" | AG =sold to, WE = Ship to, SP = Carrier, RE =payer |
| 59 | 17 | CFG_SITE_ID | Partner Number |

E2EDK06 File Creation Date

| Position | Size | Contents | Description |
|---|---|---|---|
| 1 | 10 | "E2EDK06" | |
| 56 | 3 | "035" | Date Qual. 001 =0 Create Date, 035 = Ship date |
| 59 | 35 | | Date file created: YYYYMMDD |

"As Built" Configuration Records

This section describes the records for each field of the "As built" configuration. Each piece of information requires two records to be written to the output file. The first (E2EDPT1) record contains type information that identifies the information in the (E2EDPT2) record(s) that follow.

The following tables describe the general format for all "As built" configuration records.

| Position | Size | Contents | Description |
|---|---|---|---|
| 1 | 10 | "E2EDPT1" | |
| 56 | 4 | Descriptor | Qualifier Z999 = Serial #, Z200–Z500 = Options |
| 60 | 1 | "E" | |

One or more of these records will follow the "T1" record. For example, if multiple memory modules are specified, then each one is recorded separately.

| Position | Size | Contents | Description |
|---|---|---|---|
| 1 | 10 | "E2EDPT2" | |
| 56 | 30 | description | Serial # or option description |
| 86 | 30 | CCP db content 1 | option value or serial number |
| 116 | 10 | CCP db content 2 | Option part number |
| 126 | 50 | CCP db content 3 | |
| 176 | 40 | CCP db content 4 | |
| 216 | 30 | CCP db content 5 | |
| 246 | 30 | CCP db content 6 | |

The following Descriptor table is used to fill in columns of the E2EDPT1 and E2EDPT2 records.

| Descriptor | Req/opt | Description | CCP Database Content 1 | CCP Database Content 2 | CCP Database Content 3 | CCP Database Content 4 |
|---|---|---|---|---|---|---|
| Z200E | REQ | BASE MODEL | PART_DESCRIPTION | CFG-MODEL-PART_NUMBER | | |
| Z202 | REQ | HARD DRIVE | PART_DESCRIPTION | CFG_PART_NUMBER | CFG_SERIAL_SERIAL_NUMBER | |
| Z203 | REQ | MEMORY | PART_DESCRIPTION | CFG_PART_NUMBER | | |
| Z204 | OPT | CD-ROM | PART_DESCRIPTION | CFG_PART_NUMBER | CFG_SERIAL_SERIAL_NUMBER | |
| Z205 | OPT | VIDEO | PART_DESCRIPTION | CFG_PART_NUMBER | CFG_SERIAL_SERIAL_NUMBER | |
| Z208 | OPT | MODEM | PART_DESCRIPTION | CFG_PART_NUMBER | CFG_SERIAL_SERIAL_NUMBER | |
| Z209 | OPT | AUDIO | PART_DESCRIPTION | CFG_PART_NUMBER | CFG_SERIAL_SERIAL_NUMBER | |
| Z210 | OPT | NETWORK CARD | PART_DESCRIPTION | CFG_PART_NUMBER | CFG_SERIAL_SERIAL_NUMBER | |
| Z211 | OPT | 3rd PARTY HARDWARE | NON_COMPAQ_DESCRIPTION | NON_COMPAQ_UPC_NUMBER | NON_COMPAQ_SERIAL_NUMBER | NON_COMPAQ_MFG_NAME |
| Z212 | OPT | 3rd PARTY SOFTWARE | NON_COMPAQ_DESCRIPTION | NON_COMPAQ_UPC_NUMBER | | NON_COMPAQ_MFG_NAME |
| Z213 | REQ | COMPAQ SOFTWARE | PART_DESCRIPTION | CFG_PART_NUMBER | | |
| Z214 | REQ | COMPAQ HARDWARE | SUPPORTS CTO | | | |
| Z215 | REQ | COA | CFG_COA | | | |
| Z216 | REQ | IMAGE | CFG_IMAGE_IDENTIFIER | | | |
| Z21MG | REQ | IMAGE | CFG_IMAGE_IDENTIFIER | | | |
| Z217 | REQ | LANGUAGE | CFT_LANGUAGE | | | |
| Z218 | REQ | OPERATING SYSTEM | CFG_OS | | | |
| Z219 | OPT | REGIONAL SETTING | CFG_REGION | | | |
| Z220 | REQ | ROM | CFG_ROM_DESCRIPTION | | | |
| Z999 | REQ | SERIAL NUMBER | CFG_SERIAL_NUMBER | | | |

| Descriptor | Req/Opt | Description | CCP Database Content 1 | CCP Database Content 2 | CCP Database Content 3 | CCP Database Content 4 | CCP Database Content 5 | CCP Database Content 6 |
|---|---|---|---|---|---|---|---|---|
| Z221 | OPT | DATA COLLECTION | DATA_COLLECTION_SERIAL_NUMBER | DATA_COLLECTION_DATE | DATA_COLLECTION_SITE | DATA_COLLECTION_ERRORCODE | | |
| Z222 | OPT | CONFIGURATION CHANGE | AUDIT_LOG_SERIAL_NUMBER | AUDIT_LOG_SITE_ID | AUDIT_LOG_USER_NAME | AUDIT_LOG_DATE | AUDIT_LOG_DI_VERSION_ID | AUDIT_LOG_ACTION |
| Z223 | REQ | WARRANTY | DESCRIPTION | PART NUMBER | NOT SUPPORTED FOR CCP | | | |

E2EDS02 Termination record

| Position | Size | Contents | Description |
|---|---|---|---|
| 1 | 10 | "E2EDS02" | |
| 56 | 3 | "001" | Number of line items with file |
| 59 | 18 | Generated number | Number of T1 records |

E2EDS01 record

| Position | Size | Contents | Description |
|---|---|---|---|
| 1 | 10 | "E2EDS01" | |
| 56 | 3 | "001" | Number of line items with file |
| 59 | 1 | "1" | |

E2EDP09 Number of Serial Numbers record

| Position | Size | Contents | Description |
|---|---|---|---|
| 1 | 10 | "E2EDP09" | |
| 303 | 1 | "1" | Number of serial numbers that pertain to this configuration ("1" for this application) |

CCPEXPRT Program

The CCPEXPRT.EXE program is a Win32 console program for Windows NT 4.0. It provides an automatic way to extract "as-built" and related records from a CCP database, write this data to a formatted text file, and send this file to another server. This provides a data gathering mechanism for CCP-generated data that will be used for Compaq service and software royalty tracking purposes.

The program processes "as-built" records that represent an individual machines which have been built using the CCP software download process. A separate output data file is created for each "as-built" record and related data, so that a single data file holds information pertaining to exactly one completed machine. These individual files are transferred to a destination server for subsequent processing.

The CCPEXPRT.EXE program begins by connecting to the CCP database. It then queries for a list of all machine serial numbers that have been marked as "shipped", but whose information has not yet been sent to Compaq (say, during a previous run of the CCPEXPRT program). The program holds the list of serial numbers in memory and processes them one at a time until the complete list has been processed.

To process a single serial number, the program does the following:

A file name is created, based on the current date and number of files (serial numbers) processed so far on this date. (See the related documentation for the naming convention used for these files.) The file is opened for writing in the current directory of the current drive. If it already exists, the file is truncated.

The program creates "EDI DC Header", "E2EDKA2 Site Identifier", and "E2EDK06 File creation date" records, and writes this data to the output file.

The program queries the details for the "BASE MODEL" record from the CONFIGURATION table. (This is done to get the current CONFIGURATION.CFG_SHIPPED value so that it can be used in later processing.)

The serial number set of E2EDPT1/E2DPT2 lines are written to the output file. (There will be exactly one of these output lines.)

The program queries the Compaq Hardware records for this serial number and writes this data to the output file in as many sets of E2EDPT1/E2DPT2 lines as necessary. (There will be at least 1, or many sets of these lines.)

The program queries the Compaq Software records for this serial number and writes this data to the output file in as many sets of E2EDPT1/E2DPT2 lines as necessary. (There will be at least 1, or many sets of these lines.)

The program queries the Non-Compaq Hardware records for this serial number and writes this data to the output file in as many sets of E2EDPT1/E2DPT2 lines as necessary. (There may be zero or many of these sets.)

The program queries the Non-Compaq Software records for this serial number and writes this data to the output file in as many sets of E2EDPT1/E2DPT2 lines as necessary. (There may be zero, or many of these sets.)

The program queries the Rom data for this serial number and writes this data to the output file in a single set of E2EDPT1/E2DPT2 lines. (There will be exactly 1 set of these records.)

The program queries the COA data for this serial number and writes this data to the output file in a single set of E2EDPT1/E2DPT2 lines. (There will be 0 or 1 set of these records.)

The program queries the Image data for this serial number and writes this data to the output file in as many sets of E2EDPT1/E2DPT2 lines as necessary. (There will be 0 or 1 set of these records.)

If image data exists for this serial number, a lookup is performed to obtain the original serial number used to create the image. Then a query obtains the Compaq Software items for this original serial number and writes this data to the output file in as many sets of E2EDPT1/E2DPT2 lines as necessary. (There will be at least 1, or many sets of these lines.)

The program queries the Language data for this serial number and writes this data to the output file in a single set of E2EDPT1/E2DPT2 lines. (There will be 0 or 1 set of these records.)

The program queries the Operating System data for this serial number and writes this data to the output file in a single set of E2EDPT1/E2DPT2 lines. (There will be exactly 1 set of these records.)

The program queries the Regional Setting data for this serial number and writes this data to the output file in a single set of E2EDPT1/E2DPT2 lines. (There will be 0 or 1 set of these records.)

The program queries the Data Collection records for this serial number and writes this data to the output file in as many sets of E2EDPT1/E2DPT2 lines as necessary. (There will be at least 1, or many sets of these lines.)

The program queries the Configuration Change Log (AUDIT_LOG table) records for this serial number and writes this data to the output file in as many sets of E2EDPT1/E2DPT2 lines as necessary. (There will be at least 1, or many sets of these lines.)

The program creates "E2EDS02 Termination" record, and writes this data to the output file.

This completes all data for a single serial number. The program closes the output file.

The program attempts to transfer the output file to the specified Compaq server. If the transfer fails, the file is deleted and the program exits with an error code.

(The output file is also deleted if the transfer succeeds). The serial number's CONFIGURATION.CFG_SHIPPED value is re-queried to determine if the configuration has been changed during processing of the above steps. If it is different than when the first step occurred, then the serial number is ignored and will be processed during a subsequent invocation of the CCPEXPRT program. Otherwise, the serial number's CONFIGURATION.CFG_SENT value is set to the current SQL Server time to denote that the transfer of this machine's information is complete. (These steps are wrapped in a SQL transaction so as to prevent other applications from changing these records at the same time.)

If the program encounters a SQL-related error during any of these steps, it will end with an exit code of 1. If the program has a non-SQL related error with any operation during these steps, the program writes these to the Windows NT application event log. It also formats a message indicating the cause of the failure and calls the AlertMail stored procedure if possible. It then exits with an error code value.

The sp_CheckConfig stored procedure is executed for the current serial number. (Results of this call are ignored by this program.) The program updates the Registry with the date and last file sequence number for use on subsequent serial numbers. The program repeats by processing all remaining serial numbers, and then exits.

Receiving Location

The configuration export file is stored in a CCP site-specific directory on the receiving server. The naming convention for this directory is \CCP\{Channel Name}\{Site} where:

Channel Name descriptive string for the CCP

Site the assigned Site identifier used in the CCP Site table

Once received, this as-built information can be utilized by any number of the manufacturer's systems or facilities. This can include royalty tracking, customer service, computer repair or rebuilding, and quality control.

Figure 12:
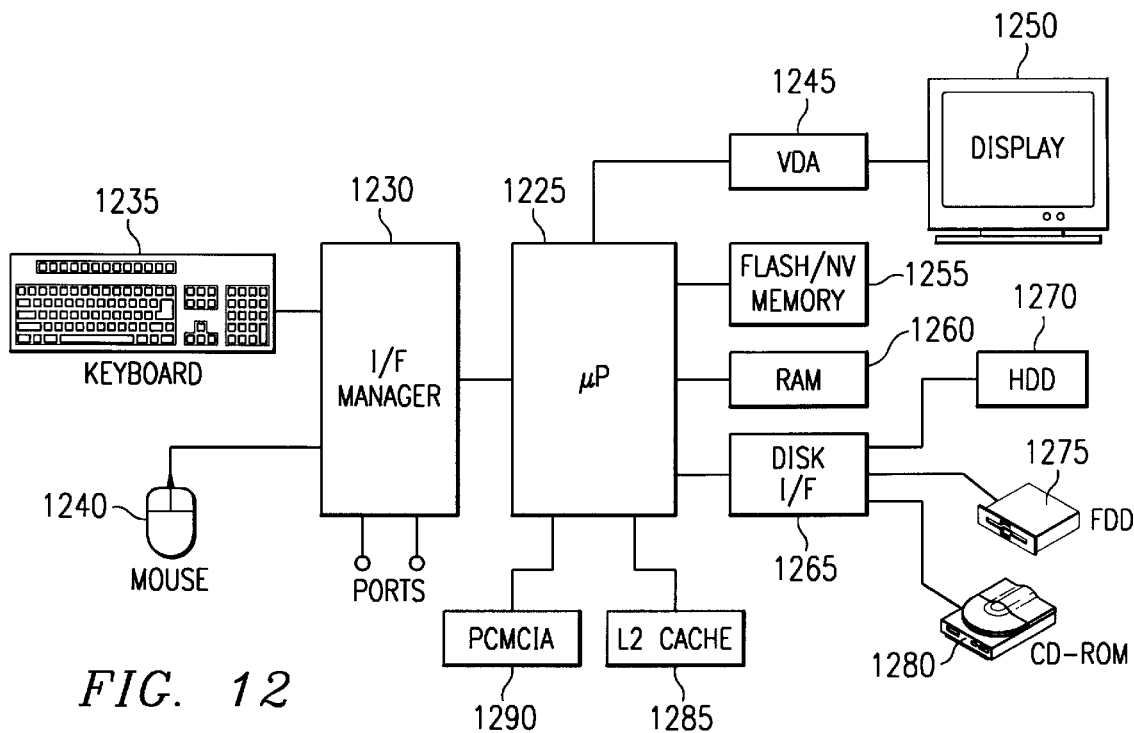
FIG. 12 shows a block diagram of a personal computer which can be manufactured using the innovations described in this application.

FIG. 12 shows a personal computer which can use the innovative software distribution system. The complete personal computer system, includes in this example: user input devices (e.g. keyboard 1235 and mouse 1240);

at least one microprocessor 1225 which is operatively connected to receive inputs from said input device, through an interface manager chip 1230 (which also provides an interface to the various ports);

a memory (e.g. flash or non-volatile memory 1255 and RAM 1260), which is accessible by the microprocessor;

a data output device (e.g. display 1250 and video display adapter card 1245) which is connected to output data generated by the microprocessor 1225; and a magnetic disk drive 1270 which is read-write accessible, through an interface unit 1265, by the microprocessor 1225;

Optionally, of course, many other components can be included, and this configuration is not definitive by any means. For example, the personal computer may also include a CD-ROM drive 1280 and floppy disk drive ("FDD") 1275 which may interface to the disk interface controller 1265. Additionally, L2 cache 1285 may be added to speed data access from the disk drives to the microprocessor, and a PCMCIA 1290 slot accommodates peripheral enhancements.

Further details of the system context and of options for implementation may be found in MICROSOFT SQL SERVER ADMINISTRATOR'S COMPANION, Ramez Elmasri & Shamkant Navathe, FUNDAMENTALS OF DATABASE SYSTEMS (1989); Martin Gruber, SQL INSTANT REFERENCE (1993); and James L. Johnson, DATABASE MODELS, LANGUAGES, DESIGN (1997); all of which are hereby incorporated by reference.

According to a disclosed class of innovative embodiments, there is provided: a system of software pre-installation, comprising: a computer network with one or more servers containing software installation configurations, a first database structure which manages said configurations, and a second database structure which manages component selection rules; at least one assembled unit connected to the network and in communication with said server; a component configuration process which accesses said second structure to produce a list of hardware and software as it is installed on said assembled unit; and a software pre-installation process which accesses said database structures and said software installation configurations to automatically pre-install software onto said assembled unit; wherein said configurations and database structures are secure from alteration by other than authorized users and processes.

According to another disclosed class of innovative embodiments, there is provided: a system of software pre-installation, comprising: a computer network with a first server containing software installation configurations and a first database structure which manages said configurations; a second server containing a database structure which manages component selection rules; at least one assembled unit connected to the network and in communication with said servers; a component configuration process which accesses said second server to produce a list of hardware and software as it is installed on said assembled unit; and a software pre-installation process which accesses said list, said first database structure, and said software installation configurations to automatically pre-install software onto said assembled unit; wherein said configurations and database structures are secure from alteration by other than authorized users and processes.

According to another disclosed class of innovative embodiments, there is provided: a system of software downloading, comprising: a computer system comprised of hardware components assembled into a predetermined hardware configuration; a computer network comprising a software-loading-system, said software-loading-system being a secure computer system which is protected against any undetectable alteration by said manufacturer and comprising a server containing software installation configurations and a database structure which manages said configurations; a software pre-installation process for selectively downloading software components from said software-loading-system into said computer system, creating a predetermined software configuration on said computer system; and a database which stores the hardware and software configuration created by said items, said database being protected against any undetectable alteration by said manufacturer.

According to another disclosed class of innovative embodiments, there is provided: a process for manufacturing computer systems with pre-installed software, comprising the steps of repeatedly: selecting a hardware and software configuration by accessing a database structure which defines software configurations based on installed hardware and producing a list of hardware and software to be installed on an assembled computer system; assembling hardware components into a predetermined hardware configuration, to create an assembled unit; connecting said assembled unit to a computer network with a software-loading-system, said software-loading-system being a secure computer system which is protected against any undetectable alteration by said manufacturer and comprising a server containing software installation configurations and a database structure which manages said configurations; and downloading software components from said software-loading-system into said computer system according to said list, to create a predetermined software configuration on said computer system; wherein said configurations and database structures are secure from alteration by other than authorized users and processes.

According to another disclosed class of innovative embodiments, there is provided: a process for controlling manufacture of computer systems by a contract manufacturer, comprising the steps of repeatedly: assembling hardware components into a predetermined hardware configuration, to create a computer system; connecting said computer system to a computer network with a software-loading-system, said software-loading-system being a secure computer system which is protected against any undetectable alteration by said manufacturer and comprising a server containing software installation configurations and a database structure which manages said configurations; selectively downloading software components from said software-loading-system into said computer system, to create a predetermined software configuration on said computer system; maintaining a database which shows the component configuration created by said steps (a.) and (b.), on each computer system; said database being protected against any undetectable alteration by said manufacturer; and repeating said steps (a.) through (d.), to manufacture computers with varying configurations.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Splitting the databases between two different servers can be used as an approach to regulating the resources used by any a given server at the remote manufacturing facility. A spilt-server architecture is possible without the expense of a second network.

Database security can be increased to afford tighter control over data or loosened to allow remote manufacturers greater access to the data.

Firewalls or other network security devices can be used within the remote manufacturing facility to prevent access to data held in master databases at the facility.

The MD5 check value is merely one way of efficiently checking a file's contents for corruption. Other values or hashing functions can be substituted for the MD5 value in order to confirm the file has reached the remote manufacturing facility line servers unaltered.

The as-built database tracks third-party hardware and software but could be narrowed to track only that software produced and installed by the manufacturer.

In the alternative embodiment, the network topologies and bandwidths described above are not the only bandwidths which can be used. In fact, different network topologies may demand higher or lower bandwidths. For example, the FDDI standard provides for a much higher bandwidth while Appletalk is much more narrow.

What is claimed is:

1. A system of software pre-installation, comprising:
   (a.) a computer network with one or more servers containing software installation configurations, a first database structure which manages said configurations, and a second database structure which manages component selection rules;
   (b.) at least one assembled unit connected to the network and in communication with said server;
   (c.) a component configuration process which accesses said second structure to produce a list of hardware and software as it is installed on said assembled unit; and
   (d.) a software pre-installation process which accesses said database structures and said software installation configurations to automatically pre-install software onto said assembled unit;
   wherein a contractor has physical access to said servers, but said configurations and database structures are secure from alteration by other than authorized users and processes.

2. The system of claim 1, wherein one database structure contains the information of said first and said second database structures.

3. The system of claim 1, wherein said first database structure and said second database structure exist on separate servers.

4. The system of claim 1, wherein said first database structure and said second database structure exist on separate servers and said separate servers are connected to different networks of varying bandwidths.

5. The system of claim 1, wherein said first database structure exists on server connected to a higher bandwidth network than said second database structure.

6. The system of claim 1, wherein said list is used to store as-built information for each said assembled unit.

7. A system of software pre-installation, comprising:
   (a.) a computer network with a first server containing software installation configurations and a first database structure which manages said configurations;
   (b.) a second server containing a database structure which manages component selection rules;
   (c.) at least one assembled unit connected to the network and in communication with said servers;
   (d.) a component configuration process which accesses said second server to produce a list of hardware and software as it is installed on said assembled unit; and
   (e.) a software pre-installation process which accesses said list, said first database structure, and said software installation configurations to automatically pre-install software onto said assembled unit;
   wherein wherein said configurations and database structures are secure from alteration by a software installer said first server has a higher bandwidth than said second server.

8. The system of claim 7, wherein said first database structure access said list to automatically download said software.

9. The system of claim 7, wherein said wherein said first database structure exists on server connected to a higher bandwidth network than said second database structure configurations and database structures are secure from alteration by other than authorized users and processes.

10. The system of claim 7, wherein said list is used to store as-built information for each said assembled unit.

11. A system of software downloading, comprising:
   (a.) a computer system comprised of hardware components assembled into a predetermined hardware configuration;
   (b.) a computer network comprising a software-loading-system, said software-loading-system being a secure computer system which is protected against any undetectable alteration by a manufacturer and comprising a server containing software installation configurations and a database structure which manages said configurations;

(c.) a software pre-installation process for selectively downloading software components from said software-loading-system into said computer system, creating a predetermined software configuration on said computer system; and (d.) a database which stores the hardware and software configuration created by said items (a.) and (b.), said database being protected against any undetectable alteration by said manufacturer.

12. The system of claim 11, wherein one database structure contains the information of both said database structures.

13. The system of claim 11, wherein said database structures exist on separate servers.

14. The system of claim 11, wherein said database structures exist on separate servers and said separate servers are connected to different networks of varying bandwidths.

15. The system of claim 11, wherein said database structure which manages said configurations exists on server connected to a higher bandwidth network than said database structure which defines software configurations.

16. A process for manufacturing computer systems with pre-installed software, comprising the steps of repeatedly:

(a.) selecting a hardware and software configuration by accessing a first server containing a first database structure which defines software configurations based on installed hardware and producing a list of hardware and software to be installed on an assembled computer system;

(b.) assembling hardware components into a predetermined hardware configuration, to create an assembled unit;

(c.) connecting said assembled unit to a computer network with a software-loading-system, said software-loading-system being a secure computer system which is protected against any undetectable alteration by a manufacturer and comprising a second server containing software installation configurations and a second database structure which manages said configurations; and (d.) downloading software components from said software-loading-system into said computer system according to said list, to create a predetermined software configuration on said computer system;

wherein said said first server has a narrower bandwidth than said second server.

17. The process of claim 16, wherein said list is used to store as-built information for each said assembled unit.

18. A process for controlling manufacture of computer systems by a contract manufacturer, comprising the steps of repeatedly:

(a.) assembling hardware components into a predetermined hardware configuration, to create a computer system;

(b.) connecting said computer system to a computer network with a software-loading-system, said software-loading-system being a secure computer system which is protected against any undetectable alteration by said contract manufacturer and comprising a server containing software installation configurations and a database structure which manages said configurations;

(c.) selectively downloading software components from said software-loading-system into said computer system, to create a predetermined software configuration on said computer system;

(d.) maintaining a database which shows the component configuration created by said steps (a.) and (b.), on each computer system; said database being protected against any undetectable alteration by said contract manufacturer; and repeating said steps (a.) through (d.), to manufacture computers with varying configurations.

19. The process of claim 18, wherein one database structure contains the information of both said database structures.

20. The process of claim 18, wherein said database structures exist on separate servers.

21. The process of claim 18, wherein said database structures exist on separate servers and said separate servers are connected to different networks of varying bandwidths.

22. The process of claim 18, wherein said database structure which manages said configurations exists on server connected to a higher bandwidth network than said database structure which defines software configurations.

* * * * *

UNITED STATES PATENT AND TRADEMARK OFFICE
CERTIFICATE OF CORRECTION

PATENT NO.   : 6,092,189
DATED        : July 18, 2000
INVENTOR(S)  : Jerald C. Fisher et al.

It is certified that error appears in the above-identified patent and that said Letters Patent is hereby corrected as shown below:

Column 54,
Line 52, change "claim 9" to read as follows:
-- The system of claim 7, wherein said first database structure exists on server connected to a higher bandwidth network than said second database structure. --

Signed and Sealed this

Sixth Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,092,189
DATED        : July 18, 2000
INVENTOR(S)  : Jerald C. Fisher et al.

It is certified that error appears in the above-identified patent and that said Letters Patent is hereby corrected as shown below:

<u>Column 54,</u>
Line 45, change the last subparagraph of claim 7 to read as follows:

-- wherein said configurations and database structures are secure from alteration by a software installer. --

Signed and Sealed this

Eleventh Day of March, 2003

JAMES E. ROGAN
*Director of the United States Patent and Trademark Office*